(12) United States Patent
Boul et al.

(10) Patent No.: US 11,293,259 B2
(45) Date of Patent: Apr. 5, 2022

(54) ADDITIVE MANUFACTURE OF WELLBORE TUBULARS

(71) Applicant: Saudi Arabian Oil Company, Dhahran (SA)

(72) Inventors: Peter J. Boul, Houston, TX (US); Carl J. Thaemlitz, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 347 days.

(21) Appl. No.: 16/206,222

(22) Filed: Nov. 30, 2018

(65) Prior Publication Data

US 2019/0169966 A1 Jun. 6, 2019

Related U.S. Application Data

(60) Provisional application No. 62/594,676, filed on Dec. 5, 2017.

(51) Int. Cl.
*E21B 33/14* (2006.01)
*E21B 43/10* (2006.01)
(Continued)

(52) U.S. Cl.
CPC .............. *E21B 33/14* (2013.01); *B28B 1/001* (2013.01); *B28B 13/022* (2013.01); *B28B 13/0275* (2013.01); *B28B 17/0081* (2013.01); *E21B 41/0078* (2013.01); *E21B 43/10* (2013.01); *B33Y 10/00* (2014.12); *B33Y 30/00* (2014.12); *B33Y 50/02* (2014.12); *B33Y 70/00* (2014.12); *B33Y 80/00* (2014.12)

(58) Field of Classification Search
CPC ................................ E21B 33/14; B28B 1/001
See application file for complete search history.

(56) References Cited

U.S. PATENT DOCUMENTS 3,690,378 A 9/1972 Land
7,153,454 B2 12/2006 Khoshnevis
(Continued)

FOREIGN PATENT DOCUMENTS

| CN | 104297097 A | 1/2015 |
|---|---|---|
| CN | 104891891 A | 9/2015 |

(Continued)

OTHER PUBLICATIONS

International Search Report and Written Opinion for related PCT application PCT/US2018/063267 dated Feb. 21, 2019; pp. 1-12.
(Continued)

*Primary Examiner* — Nicholas R Krasnow
(74) *Attorney, Agent, or Firm* — Bracewell LLP; Constance G. Rhebergen; Christopher L. Drymalla

(57) ABSTRACT

Provided are systems and method for casing a wellbore of a hydrocarbon well. The casing including disposing a casing print head in a wellbore of a hydrocarbon well, and conducting a downhole casing operation including operating the casing print head to eject casing material to form a casing tubular in the wellbore, and operating the casing print head to eject casing liner material into an annular region located between the casing tubular and a wall of the wellbore to form a casing liner in the annular region, the casing tubular and the casing liner forming a casing of the wellbore.

6 Claims, 17 Drawing Sheets

(51) Int. Cl.
  *B28B 1/00*   (2006.01)
  *B28B 13/02*   (2006.01)
  *B28B 17/00*   (2006.01)
  *E21B 41/00*   (2006.01)
  *B33Y 80/00*   (2015.01)
  *B33Y 10/00*   (2015.01)
  *B33Y 30/00*   (2015.01)
  *B33Y 50/02*   (2015.01)
  *B33Y 70/00*   (2020.01)

(56) References Cited

U.S. PATENT DOCUMENTS

| | | | |
|---|---|---|---|
| 9,388,078 | B2 | 7/2016 | Rael |
| 2013/0062072 | A1* | 3/2013 | Alvarez ............... E21B 43/086 166/376 |
| 2013/0320598 | A1 | 12/2013 | Atkins et al. |
| 2014/0262668 | A1 | 9/2014 | Austin et al. |
| 2015/0034311 | A1 | 2/2015 | Tunget |
| 2015/0054195 | A1 | 2/2015 | Greyf |
| 2015/0083422 | A1* | 3/2015 | Pritchard ............... E21B 33/13 166/292 |
| 2016/0107332 | A1 | 4/2016 | Grivetti |
| 2016/0341018 | A1* | 11/2016 | Bell .......................... F42D 1/06 |
| 2017/0173886 | A1 | 6/2017 | Menchik et al. |
| 2017/0175905 | A1 | 6/2017 | Martino et al. |
| 2017/0203468 | A1 | 7/2017 | Sherman et al. |
| 2017/0211331 | A1 | 7/2017 | Vempati et al. |
| 2017/0342797 | A1 | 11/2017 | Murphree et al. |
| 2018/0056544 | A1 | 3/2018 | Kreiger et al. |
| 2018/0093373 | A1 | 4/2018 | Niederberger |
| 2019/0078416 | A1 | 3/2019 | Vick, Jr. et al. |

FOREIGN PATENT DOCUMENTS

| | | |
|---|---|---|
| CN | 104961367 A | 10/2015 |
| CN | 105731942 A | 7/2016 |
| CN | 107313749 A | 11/2017 |
| KR | 20170120762 A | 11/2017 |
| WO | 2013043217 A2 | 3/2013 |
| WO | 2013043908 A1 | 3/2013 |

OTHER PUBLICATIONS

International Search Report and Written Opinion for related PCT application PCT/US2018/063270 dated Feb. 21, 2019; pp. 1-14.
International Search Report and Written Opinion for related PCT application PCT/US2018/063273 dated Feb. 21, 2019; pp. 1-12.
International Search Report and Written Opinion for related PCT application PCT/US2018/063278 dated Mar. 7, 2019; pp. 1-13.
Libonati, Flavia et al.; "Bone-Inspired Materials by Design: Toughness Aplification Observed Using 3D Printing and Testing**'" Advanced Engineering Materials 2016, 18, No. 8; pp. 1354-1363. https://www.youtube.com/watch?v=TgPkXHf1i6E&t=72s (Year: 2015).
Salim, Prisca et al.; "Principal Points in Cementing Geothermal Wells" Advances in Petroleum Exploration and Development, vol. 5, No. 1, 2013; pp. 77-91.

* cited by examiner

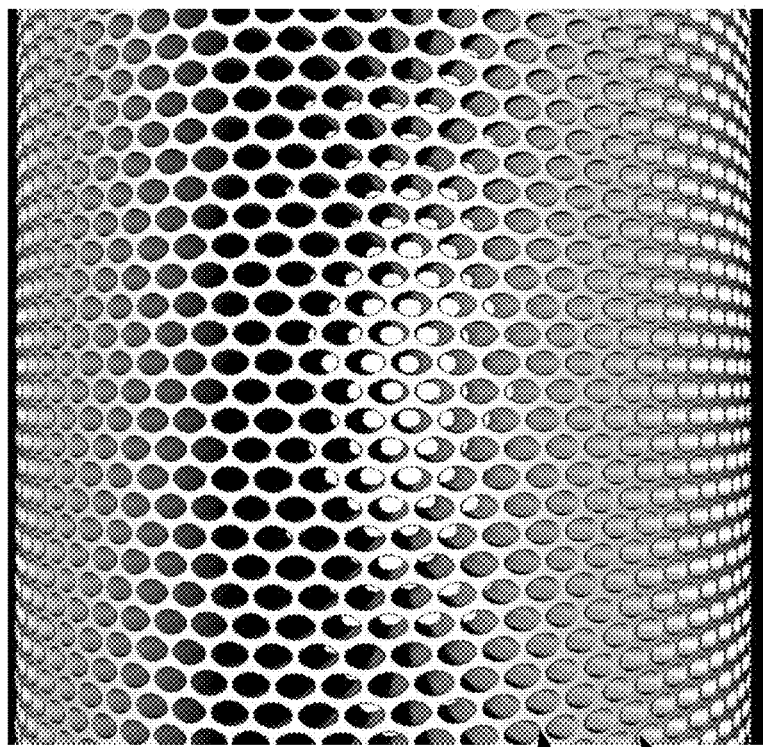
FIG. 7C  └ 702  └ 704  ← 700c
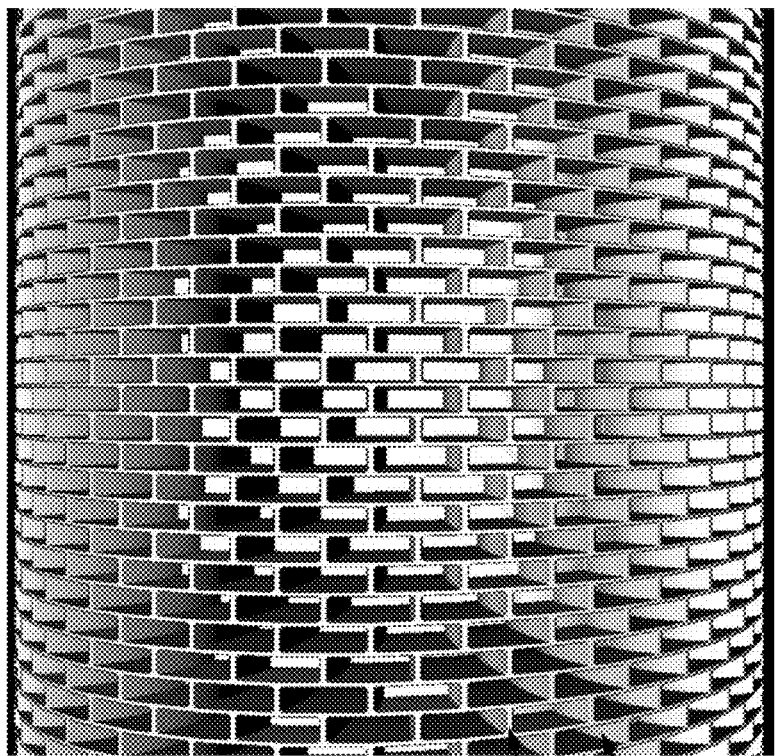
FIG. 7D  └ 702  └ 704  ← 700d

ADDITIVE MANUFACTURE OF WELLBORE TUBULARS

RELATED APPLICATIONS

This application claims the benefit of U.S. Provisional Patent Application No. 62/594,676 filed on Dec. 5, 2017 and titled "ADDITIVE MANUFACTURE OF CEMENTITIOUS MATERIALS IN A WELLBORE" which is hereby incorporated by reference in its entirety.

FIELD

Embodiments relate generally to developing wells, and more particularly to additive manufacture of cementitious materials in a wellbore of a well.

BACKGROUND

A well includes a wellbore (or "borehole") that is drilled into the earth to provide access to a subsurface formation (a geographic formation below the earth's surface) to facilitate the extraction of natural resources, such as hydrocarbons and water from the subsurface formation, to facilitate the injection of fluids into the subsurface formation, or to facilitate the evaluation and monitoring of the subsurface formation. In the petroleum industry, wells are often drilled to extract (or "produce") hydrocarbons, such as oil and gas, from subsurface formations. The term "oil well" is used to refer to a well designed to produce oil. In the case of an oil well, some natural gas is typically produced along with oil. A well producing both oil and natural gas is sometimes referred to as an "oil and gas well" or "oil well."

Creating an oil well typically involves several stages, including a drilling stage, a completion stage and a production stage. The drilling stage normally involves drilling a wellbore into a subsurface formation that is expected to contain a concentration of hydrocarbons that can be produced. The portion of the subsurface formation expected to contain hydrocarbons is often referred to as a "hydrocarbon reservoir" or "reservoir." The drilling process is usually facilitated by a drilling rig that sits at the earth's surface. The drilling rig provides for operating a drill bit to cut the wellbore, hoisting, lowering and turning drill pipe and tools, circulating drilling fluids in the wellbore, and generally controlling various operations in the wellbore (or "downhole" operations). The completion stage involves making the well ready to produce hydrocarbons. In some instances, the completion stage includes installing casing pipe into the wellbore, cementing the casing in place, perforating the casing pipe and cement, installing production tubing, and pumping fluids into the well to fracture, clean or otherwise prepare the reservoir and well to produce hydrocarbons. The production stage involves producing hydrocarbons from the reservoir by way of the well. During the production stage, the drilling rig is normally removed and replaced with a collection of valves, often referred to as a "production tree", that regulates pressure in the wellbore, controls production flow from the wellbore and provides access to the wellbore in the event further completion work is needed. A pump jack or other mechanism is sometimes used to provide lift that assists in extracting hydrocarbons from the reservoir, especially in instances where the pressure in the well is so low that the hydrocarbons do not flow freely to the surface. Flow from an outlet valve of the production tree is normally connected to a distribution network of midstream facilities, such as tanks, pipelines and transport vehicles that transport the production to downstream facilities, such as refineries and export terminals.

A casing operation of a well completion can be particularly important for establishing the integrity of the well. The casing assembly usually includes a large diameter rigid casing pipe (for example, hollow-cylindrical steel pipe) that is inserted into the wellbore and is held in place by a hardened material, such as cement, disposed in an annular region formed between an exterior of the casing pipe and the wall of the wellbore. A casing operation typically includes lowering the casing pipe into the wellbore and pumping cement into the annular region to secure the casing pipe in place and effectively seal the annular region to prevent fluids and gasses from moving through the annular region. During completion operations the casing pipe and cement are often perforated to provide fluid communication with the surrounding portion of the reservoir. For example, in the case of a production oil well in which a given depth interval of the reservoir is expected to contain oil and gas, perforations can be made in the casing pipe and cement across the depth interval to facilitate the flow of oil and gas from the reservoir, into the interior of the casing pipe. During the production stage, the interior of casing pipe, or production tubing located inside the casing, can serve as a conduit to direct the oil and gas to the surface.

In a traditional well the casing system often contains multiple intervals of casing successively placed within previous casing runs that extend deep into the wellbore. These can include, for example, a conductor pipe extending from the earth's surface into a first depth interval, surface casing extending from the conductor pipe into a second depth interval, intermediate casing extending from the surface casing into a third depth interval, and production casing extending from the intermediate casing into a fourth depth interval. The production casing may, for example, include perforations that provide fluid communication with a production zone of the surrounding reservoir within the fourth depth interval. The casing typically serves multiple functions that are critical to operating and maintaining integrity of the well. The casing can prevent the formation from caving into the wellbore (for example, by providing a rigid structure lining the wellbore), can provide for control of downhole pressure (for example, by sealing the annular region to direct pressurized formation fluids into the interior of the casing where it can be controlled by valves coupled to the casing), and can provide for selective isolation of different portions of the formation (for example, by sealing-off a first depth interval of the wellbore to inhibit water production across the first depth interval and providing a conduit for oil production from a second depth interval where perforations are present).

SUMMARY

Applicant has recognized that existing techniques for casings wells have shortcomings. For example, traditional casing operations may not provide a suitable level of structural integrity. In many instances, a casing operation involves installing a casing pipe into a wellbore and a cementing operation to secure the casing pipe in the wellbore. The cementing operation normally involves determining a volume of an annular region formed between an exterior of the casing pipe and the wall of the wellbore to be filled with cement, pumping the determined volume of cement into the annular region, and allowing the cement to harden to fix the casing pipe in place. This can include, for example, pumping a volume of cement slurry down through an interior of the casing pipe, where it is expelled from a down-hole end of the casing and moves up-hole into the annular region, to fill the annular region. Unfortunately, the movement and placement of the cement can be difficult to predict and track, and is prone to forming inconsistencies that can compromise the integrity of the cement. For example, imprecise placement of the cement may create undesirable voids in the cement that can lead to unexpected fractures, and even catastrophic ruptures when the cement is exposed to high pressure fluids in the wellbore. Given the importance of cement integrity, well operators dedicate a significant amount of time and money to inspect and monitor the cement, both at the time of installation and over the life of the well. For example, a well operator may regularly conduct logging operations to assess the condition of the cement over the life of a well. Thus, traditional casing operations may introduce inconsistencies that have to be identified and monitored, thereby adding to the complexity, risks and costs of developing and operating a well.

As a further example of a shortcoming, traditional casing operations can be time consuming and costly. In many instances, a casing operation requires a significant amount of time to place the casing pipe and cement the casing pipe in place, and requires other operations to be suspended while the casing operation is completed. For example, after a first depth interval of a well is drilled, a drilling string (for example, including drill pipe and a drill bit) may be removed, a first interval of casing pipe may be positioned in the first depth interval of the wellbore, cement slurry may be pumped into the annular region, additional time may be taken to allow the cement to harden, and, once the cement has hardened, the drilling of the next depth interval may proceed. This can include, for example, drilling out the hardened cement at the bottom of the casing and proceeding to drill deeper into the formation. Thus, traditional casing operations can require a stop-start approach that requires additional runs and operations (for example, pulling a drill string, running the casing pipe, cementing the casing pipe in place, and re-running the drill string) that increase the time and costs for drilling and completing a well.

Recognizing these and other shortcomings of existing well casing operations, Applicant has developed novel systems and methods for casing wells. In some embodiments, a casing operation for a wellbore employs an additive manufacturing (AM) technique, such as three-dimensional (3D) printing, to deposit a wellbore lining material, such as cement, in the wellbore. For example, an additive printing device, such as a 3D cement printing head, may be positioned in an annular region of the wellbore, located between an exterior of casing pipe positioned in the wellbore and the wall of the wellbore. The additive printing device may be operated to precisely deposit layers of cement in the annular region as it is advanced along a length of the annular region of the wellbore to create printed layers of a casing liner that, in combination, form a volume of a printed casing liner that fills a depth interval of the annular region. Advantageously, the precise incremental placement of the casing liner material can help to ensure that the casing liner material is deposited in specific locations and does not include inconsistencies, such as unwanted voids, that can negatively impact the mechanical properties of the casing liner and compromise the integrity of the casing. For example, the additive manufacture of the cement can enable the precise control and monitoring of the amount of cement deposited in each location within the annular region to form a printed cement casing liner.

In some embodiments, the additive printing device includes a printing head having one or more nozzles that deliver the wellbore lining material to particular locations within the wellbore. For example, the additive printing device may include a 3D cement printing head having one or more nozzles that eject the casing liner material, such as cement, to particular locations within the annular region. In some embodiments, the one or more nozzles include nozzles for depositing different materials that form the printed casing liner. For example, the one or more nozzles may include a set of cement nozzles for depositing cement, and a set of additive nozzles for depositing additives, such as polymers, that can be deposited with the cement to form the printed cement casing. Such an arrangement may enable multiple materials to be deposited simultaneous during a cementing operation to form a printed casing liner that includes a cementitious matrix of cement and other materials.

In some embodiments, the printed casing liner is formed to include integrated structures that modify mechanical properties of the casing liner. In some embodiments, the integrated structures include volumes within the printed casing liner that are void of the casing liner material. For example an integrated structure may include a void in the printed casing cement liner that includes a volume of a gas, liquid or solid (other than cement material) that is encapsulated in the cement material. In some embodiments, the integrated structures are strategically positioned and shaped to effect particular modifications to the mechanical properties of the casing liner, such as ductility or impact resistance. For example, the printed cement casing liner may be printed to include a pattern of integrated structures extending in a radial or longitudinal direction of the wellbore. Such integrated structures may reduce the Young's Modulus of the printed casing cement (relative to that of a solid cement structure) in the radial or longitudinal direction, thereby enabling the cement to deform radially or longitudinally to absorb variations in radial or longitudinal stresses acting on the printed cement casing liner, without cracking or otherwise failing.

In some embodiments, an integrated structure is formed in the wellbore independent of the depositing of the casing liner material. For example, an integrated structure, such as a honeycomb shaped polymer material, may be printed in the annular region of the wellbore to from an integrated structure having contiguous voids formed in the structure. Then, cement material may be injected into the contiguous voids of the integrated structure to form a printed casing liner formed of a cementitious matrix of the cement material and integrated structure material. In some embodiments, the casing liner material is formed in the wellbore independent of the integrated structures. For example, the cement material may be printed in the annular region of the wellbore with one or more contiguous integrated void structures formed in the cement material, such as a contiguous honeycomb shaped void structure. Then, an integrated structure material, such as a polymer, may be injected into the one or more contiguous integrated void structures of the printed cement material to form a printed casing liner formed of a cementitious matrix of the cement material and the additive material structure.

Provided in some embodiments is a method that includes drilling a wellbore into a subsurface formation, positioning casing pipe in the wellbore, and conducting a cementing operation including additive manufacture of a casing liner in an annular region between an exterior of the casing pipe and a wall of the wellbore.

In some embodiments, the casing liner includes a cementitious material and the cementing operation includes a print head depositing the cementitious material into position to form the casing liner as the print head is advanced within the annular region. In certain embodiments, the casing liner includes a casing liner material and one or more integrated structures formed in the casing liner material. In some embodiments, the casing liner material includes cement. In certain embodiments, at least one of the one or more integrated structures includes a void in the casing liner material containing a substance other than the cement. In some embodiments, the substance includes a gas, a fluid or a solid other than the cement. In some embodiments, the one or more integrated structures include elongated voids in the casing liner material extending in a radial direction in the annular region and containing a substance having a Young's Modulus that is less than a Young's Modulus of the casing liner material such that the casing liner has a Young's Modulus in the radial direction that is less than the Young's Modulus of the casing liner material. In certain embodiments, the integrated structures include elongated voids in the casing liner material extending in a longitudinal direction in the annular region and containing a substance having a Young's Modulus that is less than a Young's Modulus of the casing liner material such that the casing liner has a Young's Modulus in the longitudinal direction that is less than the Young's Modulus of the casing liner material. In some embodiments, the additive manufacture of the casing liner includes additive manufacture of an integrated structure in the annular region (the integrated structure having one or more voids formed therein) and the cementing operation further includes injecting a cementitious material into the one or more voids of the integrated structure.

In certain embodiments, the additive manufacture of the casing liner includes additive manufacture of a cement structure in the annular region (the cement structure having one or more voids formed therein) and the cementing operation further includes injecting a substance into the one or more voids of the cement structure. In some embodiments, positioning the casing pipe in the wellbore includes conducting additive manufacture of the casing pipe in the wellbore. In some embodiments, the additive manufacture of a casing liner in the annular region and the additive manufacturing of the casing pipe in the wellbore include forming one or more perforations in the casing liner and the casing pipe to facilitate flow of substances between the formation and a central passage of the casing pipe.

Provided in some embodiments is a well system that includes an additive manufacture device including a print head including one or more nozzles adapted to deposit casing liner material in a wellbore of a well, and a well control system adapted to perform a cementing operation including controlling the additive manufacture device to perform an additive manufacture of a casing liner in the wellbore including depositing the casing liner material in an annular region of the wellbore located between an exterior of a casing pipe positioned in the wellbore and a wall of the wellbore to form a casing liner in the wellbore.

In some embodiments, the casing liner material includes a cementitious material and the cementing operation includes controlling the print head to advance within the annular region and deposit the cementitious material into position to form the casing liner as the print head is advanced within the annular region. In certain embodiments, the casing liner includes a casing liner material and one or more integrated structures formed in the casing liner material. In some embodiments, the casing liner material includes cement. In certain embodiments, at least one of the one or more integrated structures includes a void in the casing liner material containing a substance other than the cement. In some embodiments, the substance includes a gas, a fluid or a solid other than the cement. In certain embodiments, the one or more integrated structures include elongated voids in the casing liner material extending in a radial direction in the annular region and containing a substance having a Young's Modulus that is less than a Young's Modulus of the casing liner material such that the casing liner has a Young's Modulus in the radial direction that is less than the Young's Modulus of the casing liner material. In some embodiments, the integrated structures include elongated voids in the casing liner material extending in a longitudinal direction in the annular region and containing a substance having a Young's Modulus that is less than a Young's Modulus of the casing liner material such that the casing liner has a Young's Modulus in the longitudinal direction that is less than the Young's Modulus of the casing liner material.

In certain embodiments, the additive manufacture of the casing liner includes additive manufacture of an integrated structure in the annular region (the integrated structure having one or more voids formed therein) and the cementing operation further includes controlling injection of a cementitious material into the one or more voids of the integrated structure. In some embodiments, the additive manufacture of the casing liner includes additive manufacture of a cement structure in the annular region (the cement structure having one or more voids formed therein) and the cementing operation further includes controlling injection of a substance into the one or more voids of the cement structure. In some embodiments, the well control system is further adapted to perform a casing pipe operation including controlling the additive manufacture device to perform an additive manufacture of the casing pipe in the wellbore. In some embodiments, the additive manufacture of a casing liner in the annular region and the additive manufacturing of the casing pipe in the wellbore include forming one or more perforations in the casing liner and the casing pipe to facilitate flow of substances between the formation and a central passage of the casing pipe.

Provided in some embodiments, is a non-transitory computer readable medium including program instructions stored thereon that are executable by a processor to cause the operations of drilling a wellbore into a subsurface formation, positioning casing pipe in the wellbore, and conducting a cementing operation including additive manufacture of a casing liner in an annular region between an exterior of the casing pipe and a wall of the wellbore.

In some embodiments, the casing liner includes a cementitious material and the cementing operation includes a print head depositing the cementitious material into position to form the casing liner as the print head is advanced within the annular region. In certain embodiments, the casing liner includes a casing liner material and one or more integrated structures formed in the casing liner material. In some embodiments, the casing liner material includes cement. In certain embodiments, at least one of the one or more integrated structures includes a void in the casing liner material containing a substance other than the cement. In some embodiments, the substance includes a gas, a fluid or a solid other than the cement. In certain embodiments, the one or more integrated structures include elongated voids in the casing liner material extending in a radial direction in the annular region and containing a substance having a Young's Modulus that is less than a Young's Modulus of the casing liner material such that the casing liner has a Young's Modulus in the radial direction that is less than the Young's Modulus of the casing liner material. In some embodiments, the integrated structures include elongated voids in the casing liner material extending in a longitudinal direction in the annular region and containing a substance having a Young's Modulus that is less than a Young's Modulus of the casing liner material such that the casing liner has a Young's Modulus in the longitudinal direction that is less than the Young's Modulus of the casing liner material.

In certain embodiments, the additive manufacture of the casing liner includes additive manufacture of an integrated structure in the annular region (the integrated structure having one or more voids formed therein) and the cementing operation further includes injecting a cementitious material into the one or more voids of the integrated structure. In some embodiments, the additive manufacture of the casing liner includes additive manufacture of a cement structure in the annular region (the cement structure having one or more voids formed therein) and the cementing operation further includes injecting a substance into the one or more voids of the cement structure. In certain embodiments, positioning the casing pipe in the wellbore includes conducting additive manufacture of the casing pipe in the wellbore. In some embodiments, the additive manufacture of a casing liner in the annular region and the additive manufacturing of the casing pipe in the wellbore include forming one or more perforations in the casing liner and the casing pipe to facilitate flow of substances between the formation and a central passage of the casing pipe.

Provided in some embodiments is a method of casing a wellbore of a hydrocarbon well. The method including disposing a casing print head in a wellbore of a hydrocarbon well, and conducting a downhole casing operation including operating the casing print head to eject casing material to form a casing tubular in the wellbore, and operating the casing print head to eject casing liner material into an annular region located between the casing tubular and a wall of the wellbore to form a casing liner in the annular region, the casing tubular and the casing liner forming a casing of the wellbore.

In some embodiments, the downhole casing operation includes advancing the casing print head along a length of the wellbore and ejecting the casing material and the casing liner material along the length of the wellbore to form the casing along the length of the wellbore. In certain embodiments, the downhole casing operation includes forming a perforation in the casing. In some embodiments, forming a perforation in the casing includes operating the casing print head to form a contiguous void extending across the casing tubular and the casing liner. In certain embodiments, operating the casing print head to form a contiguous void extending across the casing tubular and the casing liner includes operating the casing print head to deposit a disposable material to define the contiguous void extending across the casing tubular and the casing liner, and the method further including performing a perforation operation including removing the disposable material. In some embodiments, the disposable material includes a dissolvable material, and where the perforation operation includes exposing the dissolvable material to a substance adapted to dissolve the dissolvable material. In certain embodiments, the casing material includes a metal material. In some embodiments, the casing material includes steel. In certain embodiments, the casing liner material includes a cementitious material. In some embodiments, the casing liner material includes casing cement.

Provided in some embodiments is a wellbore casing system that includes a casing print head adapted to be disposed in a wellbore of a hydrocarbon well, and adapted to eject casing material to form a casing tubular in the wellbore, and eject casing liner material into an annular region located between the casing tubular and a wall of the wellbore to form a casing liner in the annular region, the casing tubular and the casing liner forming a casing of the wellbore.

In some embodiments, the casing print head is adapted to be advanced along a length of the wellbore and eject the casing material and the liner casing material along a length of the wellbore to form the casing along the length of the wellbore. In certain embodiments, the downhole casing operation includes forming a perforation in the casing. In some embodiments, forming a perforation in the casing includes forming a contiguous void extending across the casing tubular and the casing liner. In some embodiments, forming a contiguous void extending across the casing tubular and the casing liner includes depositing a disposable material to define the contiguous void extending across the casing tubular and the casing liner, where the disposable material is removable. In certain embodiments, the disposable material includes a dissolvable material. In some embodiments, the casing material includes a metal material. In certain embodiments, the casing material includes steel. In some embodiments, the casing liner material includes a cementitious material. In certain embodiments, the casing liner material includes casing cement.

Provided in some embodiments is a method of lining a wellbore of a hydrocarbon well. The method including disposing a liner print head in a wellbore of a hydrocarbon well and conducting a downhole lining operation including operating the lining print head to eject tubular material to form a tubular in the wellbore, and operating the lining print head to eject liner material into an annular region located between the tubular and a wall of the wellbore to form, in the annular region, a casing liner in the wellbore, the tubular and the casing liner forming a lined tubular in the wellbore. In some embodiments, the downhole lining operation includes advancing the lining print head along a length of the wellbore and ejecting the tubular material and the lining material along the length of the wellbore to form the casing along the length of the wellbore. In certain embodiments, the tubular material includes metal and the lining material includes a cementitious material.

Figure 1:
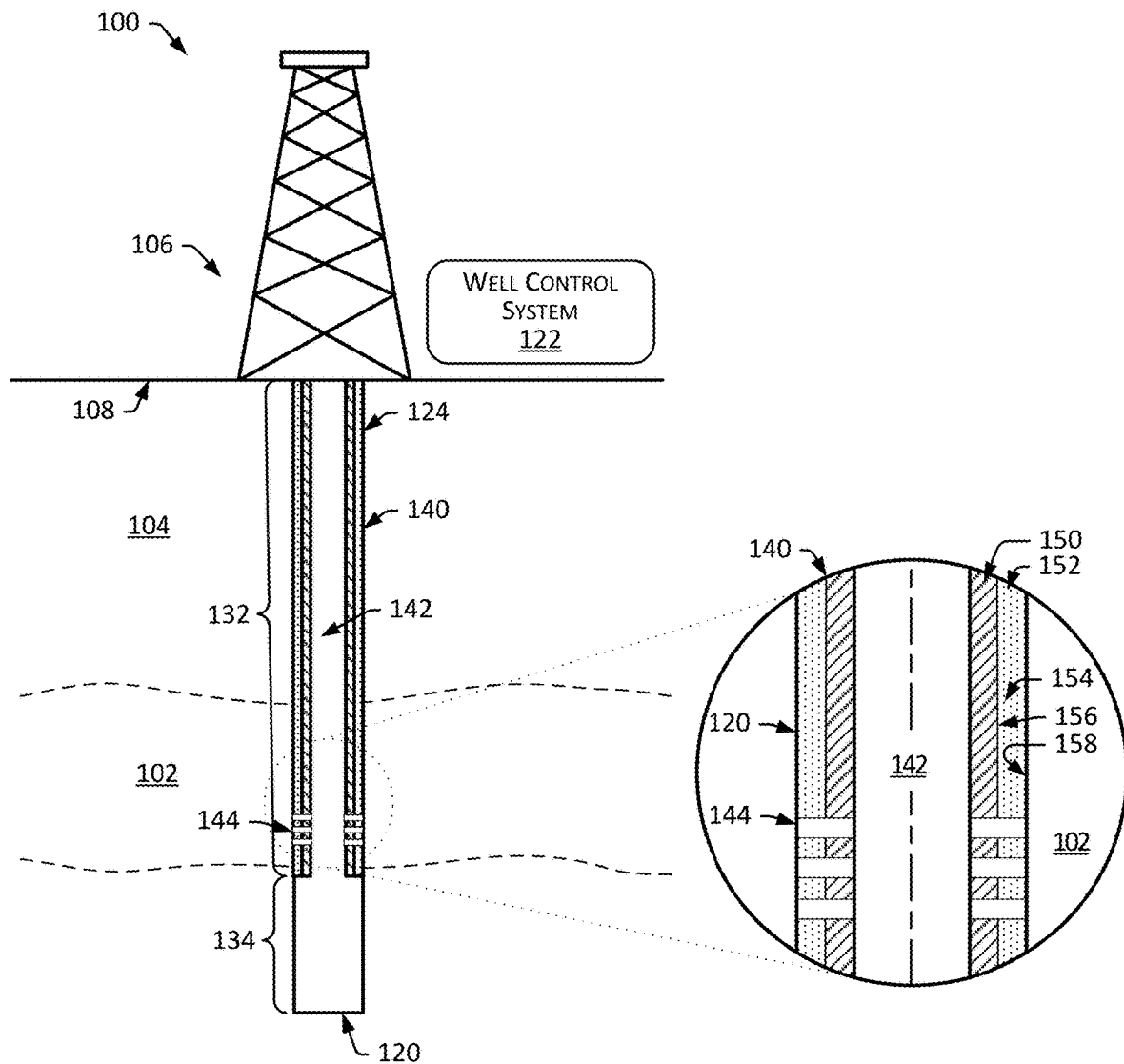
FIG. 1 is diagram that illustrates a well environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of systems and methods for casing wells. In some embodiments, a casing operation for a wellbore employs an additive manufacturing (AM) technique, such as three-dimensional (3D) printing, to deposit a wellbore lining material, such as cement, in the wellbore. For example, an additive printing device, such as a 3D cement printing head, may be positioned in an annular region of the wellbore, located between an exterior of casing pipe positioned in the wellbore and the wall of the wellbore. The additive printing device may be operated to precisely deposit layers of cement in the annular region as it is advanced along a length of the annular region of the wellbore to create printed layers of a casing liner that, in combination, form a volume of a printed casing liner that fills a depth interval of the annular region. Advantageously, the precise incremental placement of the casing liner material can help to ensure that the casing liner material is deposited in specific locations and does not include inconsistencies, such as unwanted voids, that can negatively impact the mechanical properties of the casing liner and compromise the integrity of the casing. For example, the additive manufacture of the cement can enable the precise control and monitoring of the amount of cement deposited in each location within the annular region to form a printed cement casing liner.

In some embodiments, the additive printing device includes a printing head having one or more nozzles that deliver the wellbore lining material to particular locations within the wellbore. For example, the additive printing device may include a 3D cement printing head having one or more nozzles that eject the casing liner material, such as cement, to particular locations within the annular region. In some embodiments, the one or more nozzles include nozzles for depositing different materials that form the printed casing liner. For example, the one or more nozzles may include a set of cement nozzles for depositing cement, and a set of additive nozzles for depositing additives, such as polymers, that can be deposited with the cement to form the printed cement casing. Such an arrangement may enable multiple materials to be deposited simultaneously during a cementing operation to form a printed casing liner that includes a cementitious matrix of cement and other materials.

In some embodiments, the printed casing liner is formed to include integrated structures that modify mechanical properties of the casing liner. In some embodiments, the integrated structures include volumes within the printed casing liner that are void of the casing liner material. For example an integrated structure may include a void in the printed casing cement liner that includes a volume of a gas, liquid or solid (other than cement material) that is encapsulated in the cement material. In some embodiments, the integrated structures are strategically positioned and shaped to effect particular modifications to the mechanical properties of the casing liner, such as ductility or impact resistance. For example, the printed cement casing liner may be printed to include a pattern of integrated structures extending in a radial or longitudinal direction of the wellbore. Such integrated structures may reduce the Young's Modulus of the printed casing cement (relative to that of a solid cement structure) in the radial or longitudinal direction, thereby enabling the cement to deform radially or longitudinally to absorb variations in radial or longitudinal stresses acting on the printed cement casing liner, without cracking or otherwise failing.

In some embodiments, an integrated structure is formed in the wellbore independent of the depositing of the casing liner material. For example, an integrated structure, such as a honeycomb shaped polymer material, may be printed in the annular region of the wellbore to from an integrated structure having contiguous voids formed in the structure. Then, cement material may be injected into the contiguous voids of the integrated structure to form a printed casing liner formed of a cementitious matrix of the cement material and integrated structure material. In some embodiments, the casing liner material is formed in the wellbore independent of the integrated structures. For example, the cement material may be printed in the annular region of the wellbore with one or more contiguous integrated void structures formed in the cement material, such as a contiguous honeycomb shaped void structure. Then, an integrated structure material, such as a polymer, may be injected into the one or more contiguous integrated void structures of the printed cement material to form a printed casing liner formed of a cementitious matrix of the cement material and the additive material structure.

FIG. 1 is diagram that illustrates a well environment 100 in accordance with one or more embodiments. In the illustrated embodiment, the well environment 100 includes a hydrocarbon reservoir ("reservoir") 102 located in a subsurface formation ("formation") 104 and a well system ("well") 106.

The formation 104 may include a porous or fractured rock formation that resides underground, beneath the earth's surface ("surface") 108. In the case of the well 106 being a hydrocarbon well, the reservoir 102 may include a portion of the formation 104 that contains (or is at least determined to or expected to contain) a subsurface pool of hydrocarbons, such as oil and gas. The formation 104 and the reservoir 102 may each include different layers of rock having varying characteristics, such as varying degrees of permeability, porosity, and resistivity. In the case of the well 106 being operated as a production well, the well 106 may facilitate the extraction (or "production") of hydrocarbons from the reservoir 102. In the case of the well 106 being operated as an injection well, the well 106 may facilitate the injection of fluids, such as water, into the reservoir 102. In the case of the well 106 being operated as a monitoring well, the well 106 may facilitate the monitoring of characteristics of the reservoir 102, such reservoir pressure or water encroachment.

The well 106 may include a wellbore 120, a well control system ("control system") 122 and a well casing system 124. The well control system 122 may control various operations of the well 106, such as well drilling operations, well completion operations, well injection operations, and well and formation monitoring operations. In some embodiments, the well control system 122 includes a computer system that is the same as or similar to that of computer system 2000 described with regard to at least FIG. 12.

The wellbore 120 may include a bored hole that extends from the surface 108 into a target zone of the formation 104, such as the reservoir 102. An upper end of the wellbore 120 at or near the surface 108 may be referred to as the "up-hole" end of the wellbore 120, and a lower end of the wellbore 120 terminating in the formation 104 may be referred to as the "down-hole" end of the wellbore 120. The wellbore 120 may be created, for example, by a drill bit boring through the formation 104 and the reservoir 102. The wellbore 120 can provide for the circulation of drilling fluids during drilling operations, the flow of hydrocarbons (for example, oil and gas) from the reservoir 102 to the surface 108 during production operations, the injection of substances (for example, water) into one or both of the formation 104 and the reservoir 102 during injection operations, or the communication of monitoring devices (for example, logging tools) into one or both of the formation 104 and the reservoir 102 during monitoring operations (for example, during in situ logging operations).

In some embodiments, the wellbore 120 includes cased or uncased portions. For example the wellbore 120 may have a cased portion 132 and an uncased (or "open-hole") portion 134. The cased portion 132 may include a portion of the wellbore 120 having casing 140 of the well casing system 124 disposed in that portion. The uncased portion 134 may include a portion of the wellbore 120 not having casing 140 disposed in that portion.

In some embodiments, the casing 140 includes an annular casing that lines the wall of the wellbore 120 to define a central passage 142 that provides a conduit for the transport of tools and substances through the wellbore 120. For example, the central passage 142 may provide a conduit for lowering logging tools into the wellbore 120, a conduit for the flow of production substances, such as oil and gas, from the reservoir 102 to the surface 108, or a conduit for the flow of injection substances, such as water, from the surface 108 into the formation 104. In some embodiments, the casing 140 includes perforations 144. The perforations 144 may include openings that extend between an exterior surface of the casing 140 and the central passage 142 of the casing 140 to facilitate the flow of production substances, such as oil and gas, from the reservoir 102 into the central passage 142, or to facilitate the flow of injection substances, such as water, from the central passage 142 into the formation 104. Although certain embodiments describe a perforation 144 as one or more elongated holes in the casing 140 for the purpose of illustration, embodiments can include any suitable form of perforations 144. For example, perforations 144 may include in a mesh structure defined by a plurality of relatively small holes that enable the flow of substances across the holes, while also filtering out larger debris from the flowing substance.

In some embodiments, the casing 140 includes a casing pipe 150 and a casing liner 152, as illustrated at least in the detail section of FIG. 1. The casing pipe 150 may include a hollow pipe that defines the central passage 142. The casing pipe 150 may include, for example, a hollow-cylindrical steel pipe. The casing liner 152 may include a rigid material, such as cement, disposed in an annular region 154 located between an exterior surface 156 of the casing pipe 150 and the interior wall 158 of the wellbore 120. The casing liner 152 may fill the annular region 154 to secure the casing pipe 150 in place and seal the annular region 154. This can help to inhibit substances, such as high pressure gases and liquids, from bypassing the central passage 142 and flowing through the annular region 154.

Figure 2A:
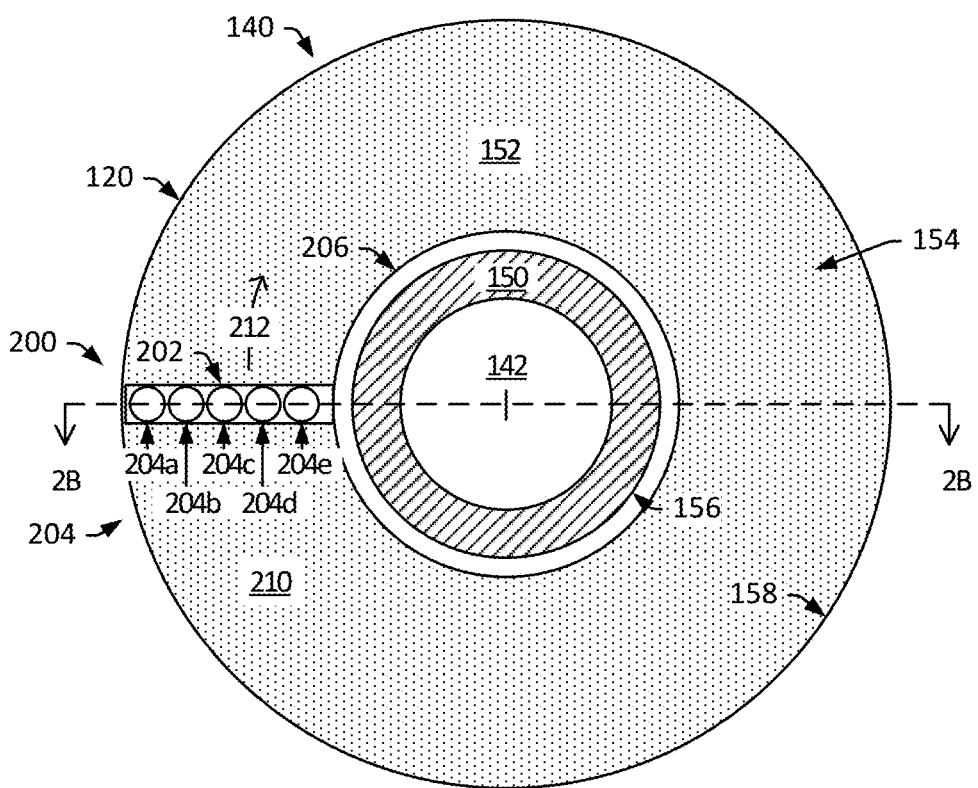
FIGS. 2A and 2B are diagrams that illustrate an example casing liner formed by way of an additive manufacturing process in accordance with one or more embodiments.
Figure 2B:
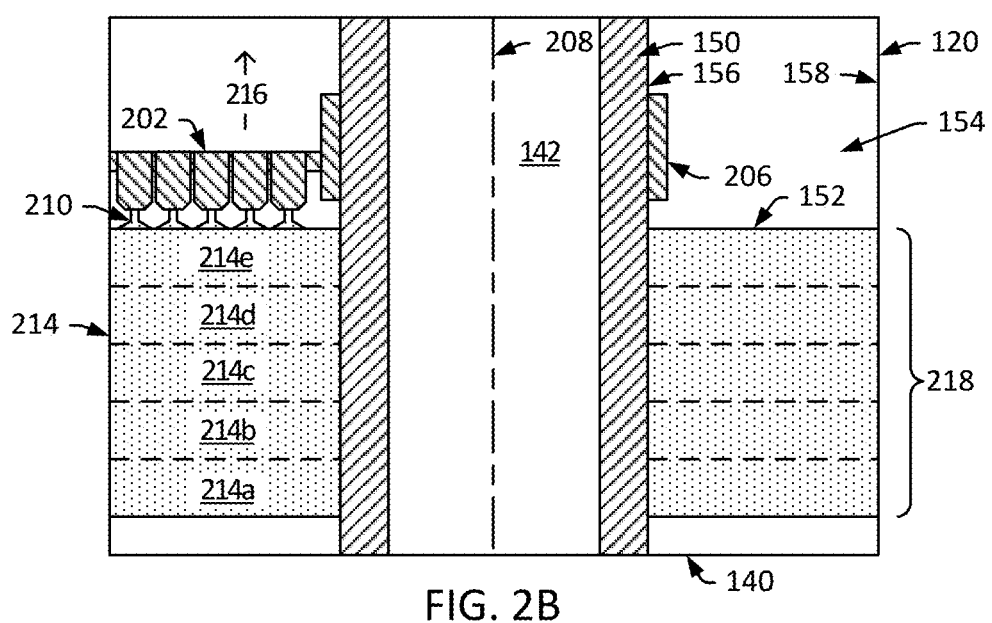

In some embodiments, the casing liner 152 is installed in the annular region 154 by way of an additive manufacturing process. For example, the casing liner 152 may be formed of cement that is deposited into place by way of a 3D cement printing process. FIGS. 2A and 2B are diagrams that illustrate top and side section views of an example casing liner 152 formed by way of an additive manufacturing process in accordance with one or more embodiments. In the illustrated embodiment, a casing liner printing system 200 includes a print head 202 positioned in the annular region 154 of the wellbore 120. The print head 202 may include one or more nozzles 204 (for example, nozzles 204a-204e) coupled to a cylindrical collar 206 disposed about the exterior surface 156 of the casing pipe 150. During a casing liner printing operation of a casing operation, the casing liner printing system 200 may be operated to eject casing liner material 210 from the nozzles 204 to form (or "print") the casing liner 152. For example, during a casing liner printing operation, the print head 202 may be rotated about the casing pipe 150 and a longitudinal axis 208 of the wellbore 120 (as illustrated by the arrow 212) as casing liner material 210, such as cement, is ejected from the nozzles 204 to deposit the casing liner material 210 in particular locations to form at least a first layer 214a of the casing liner 152 in the annular region 154.

In some embodiments, multiple rotational passes of the print head 202 are made in coordination with the print head 202 being advanced along a length of the wellbore 120 (for example, parallel to the longitudinal axis 208 of the wellbore 120) to deposit multiple casing liner layers 214 of the casing liner material 210 (for example, layers 214a-214e) to form the casing liner 152. Continuing with the prior example, during a casing liner printing operation, after the first layer 214a is formed by way of a first rotational pass of the print head 202 about the casing pipe 150, the print head 202 may be advanced longitudinally along the length of the wellbore 120 (as illustrated by the arrow 216) (for example, parallel to a longitudinal axis 208 of the wellbore 120) by a distance equal to a thickness of a second layer 214b of the casing liner 152 to be formed, and again be rotated about the casing pipe 150 (as illustrated by the arrow 212) while ejecting casing liner material 210 from the nozzles 204 to deposit the casing liner material 210 in particular locations to form the second layer 214b of the casing liner 152 in the annular region 154. A similar iterative layering approach can be conducted to form additional layers of the casing liner 152, such as layers 214c-214e. The layers 214a-214e may together form the casing liner 152 across a depth interval 218. The resulting casing liner layers 214 and casing liner 152 may be referred to as "printed" casing liner layers 214 and a "printed" casing liner 152, respectively. Although only five layers (layers 214a-214e) of the casing liner 152 are discussed for the purpose of illustration, embodiments can include any suitable number of layers to form the printed casing liner 152 across a given depth interval. Although embodiments describe advancing the print head 202 vertically in an incremental manner after completing a rotational pass about the wellbore 120, embodiments can include any suitable path of advancement of the print head 202 to form the casing liner 152. For example, the print head 202 may be advanced vertically as it is rotated about the wellbore 120 to, for example, form a contiguous helical layer of casing liner material 210 across a depth interval.

In some embodiments, the operation of the print head 202, including the positioning and movement of the print head 202, the alignment and direction of the nozzles 204, and the rate of the ejection of the casing liner material 210 from the nozzles 204 is controlled by the well control system 122, to provide for the deposition of the casing liner material 210 in specific locations. In some embodiments, each of the nozzles 204 includes a flow sensor and deposition sensor that can detect and report a flow rate of the casing liner material 210 from the nozzle and a location of the deposition of the casing liner material 210, and the flow rate information and deposition information can be used by the well control system 122 to determine whether the casing liner material 210 has been appropriately placed.

Figure 3:
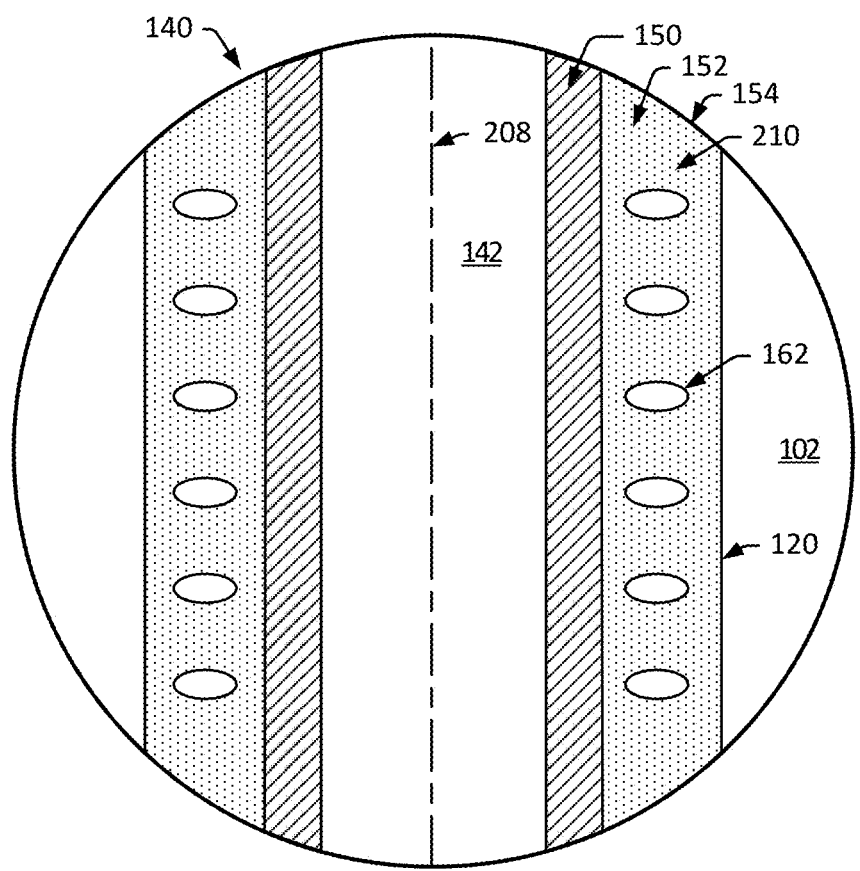
FIG. 3 is a diagram that illustrates an example of casing liner including integrated structures in accordance with one or more embodiments.

In some embodiments, the casing liner 152 contains integrated structures formed within the casing liner material 210. For example, the casing liner 152 may include a cementitious matrix formed of a cement casing liner material 210 and one or more elements forming integrated structures within the cement casing liner material 210. FIG. 3 is a diagram that illustrates a section view of an example of the casing liner 152 having integrated structures 162 formed within the casing liner material 210 in accordance with one or more embodiments. In some embodiments, an integrated structure 162 includes a void in the deposited casing liner material 210 that is filled with a volume of a substance other than the casing liner material 210, such as a gas, liquid or solid. For example, the casing liner 152 may be formed of a cement casing liner material 210 and integrated structures 162 that include pockets of a polymer formed in the cement casing liner material 210. In some embodiments, an integrated structure 162 may simply include a formed pocket of air, void of the casing liner material 210.

Figure 4A:
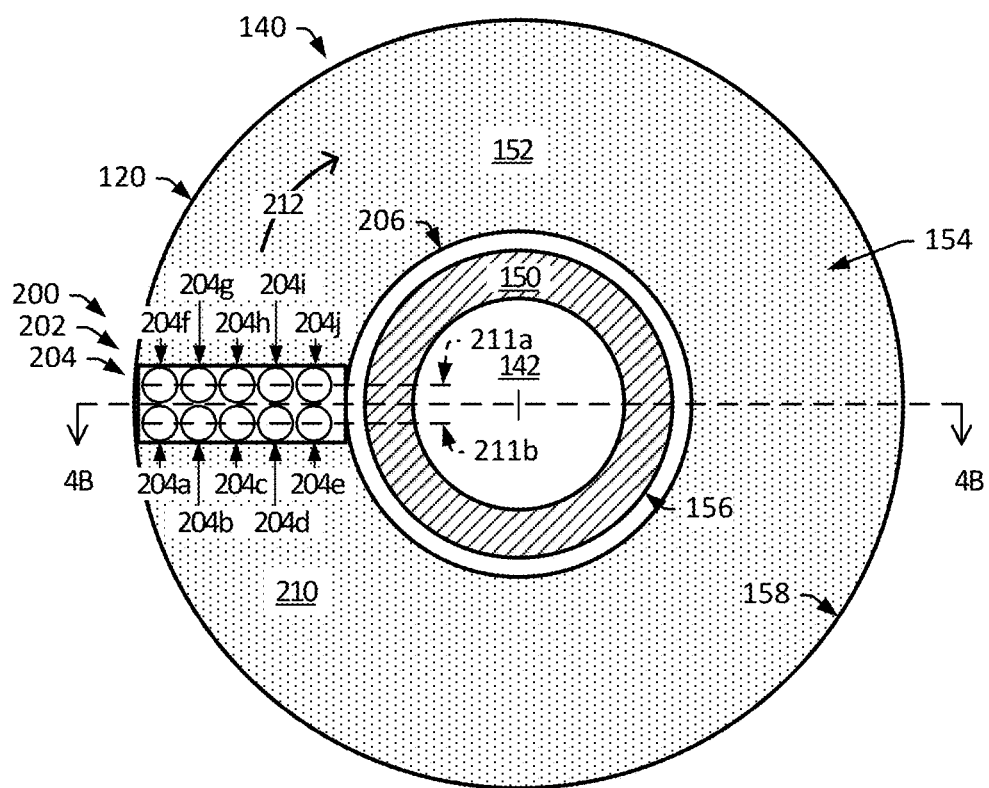
FIGS. 4A and 4B are diagrams that illustrate an example casing liner including integrated structures formed by way of an additive manufacturing process in accordance with one or more embodiments.
Figure 4B:
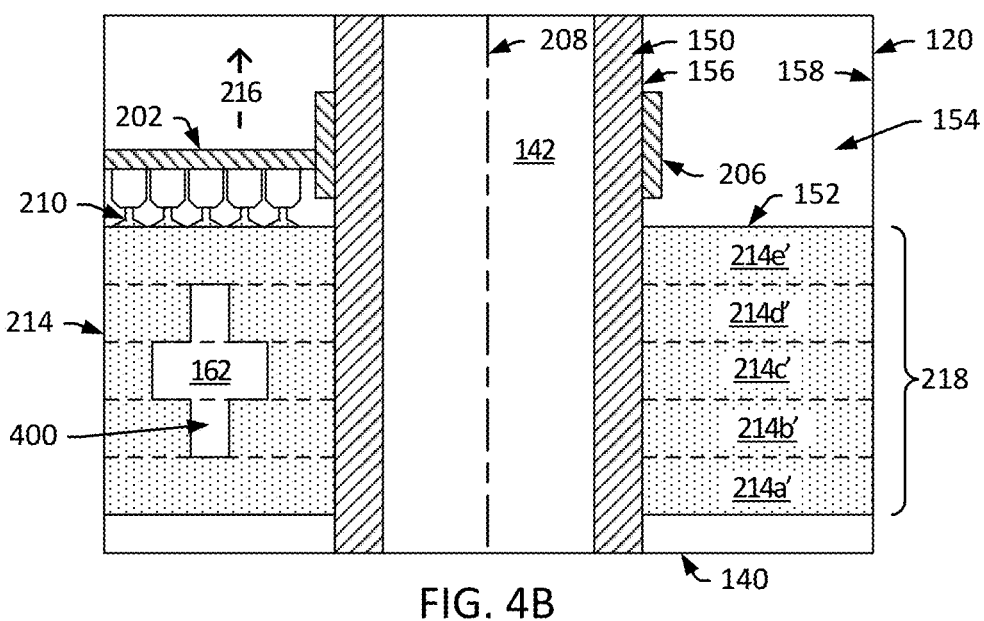

FIGS. 4A and 4B are diagrams that illustrate top and side section views of an example of the casing liner 152 including integrated structures 162 formed by way of an additive manufacturing process, in accordance with one or more embodiments. In some embodiments, the print head 202 may include a first subset of the nozzles 204 (for example, nozzles 204a-204e) for depositing a first material, such as a cement casing liner material 210, and a second subset of the nozzles 204 (for example, nozzles 204f-204j) for depositing an integrated structure material 400, such as a polymer, for forming integrated structures 162. The first subset of the nozzles 204 may include a first row of nozzles extending radially from the cylindrical collar 206 and the second subset of the nozzles 204 may include a second row of nozzles offset from the first row of nozzles. For example, the first subset of the nozzles 204 may include nozzles 204a-204e forming a first row of the nozzles 204 distributed along a first axis 211a extending radially from the cylindrical collar 206 and the second subset of the nozzles 204 may include nozzles 204f-204j forming a second row of the nozzles 204 distributed along a second axis 211b offset from the first axis 211a. In such an embodiment, one row of nozzles may "lead" with the second row of nozzles "following" or "trailing". For example during clockwise rotation of the print head 202, the second row of nozzles 204 may lead with the first row of nozzles 204 following, such that the first and second rows of nozzles pass over an area in sequence, one after the other. In some embodiments, the nozzles 204 of each of the rows of nozzles have the same radial distribution such that the two sets of nozzles 204 pass over the same radial locations. For example, the nozzles 204a-204e may be arranged to follow the same circular path in the annular region 154 as nozzles 204f-204j, respectively. This may enable different materials to be deposited in a given area in a single rotational pass of the print head 202. For example, where the nozzles 204a-204e are employed to deposit a first material (for example, cement) and the nozzles 204f-204j are employed to deposit a second material (for example, a polymer), either of the first or second material may be deposited in each area of the annular region 154 by controlling each set of the nozzles 204 to eject either the first or second material in each area. Although two rows are described for the purpose of illustration, any suitable arrangement of nozzles 204 may be employed. For example, three offset rows of nozzles 204 may be employed, with each of the three rows being operated to eject first, second and third materials respectively.

During a casing liner printing operation, the casing liner printing system 200 may be operated to eject casing liner material 210 from the first subset of the nozzles 204 (for example, from nozzles 204a-204e) and to eject integrated structure material 400 from the second set of the nozzles 204 (for example, nozzles 204f-204j) to form the casing liner 152. For example, referring to FIGS. 4A and 4B, during a casing liner printing operation, in a first pass, the print head 202 may be rotated about the casing pipe (as illustrated by the arrow 212) as casing liner material 210, such as cement, is ejected from the nozzles 204a-204e to deposit the casing liner material 210 in particular locations to form the first layer 214a' of the casing liner 152 in the annular region 154. In second, third and fourth passes, the print head 202 may be rotated about the casing pipe 150 and the longitudinal axis 208 of the wellbore 120 (as illustrated by the arrow 212) as the casing liner material 210 is ejected from the nozzles 204a-204e to deposit the casing liner material 210 in the shaded portions of the second, third, and fourth layers 214a', 214b' and 214c', respectively, and as integrated structure material 400, such as a polymer, is ejected from the nozzles 204f-204j to deposit the integrated structure material 400 in the unshaded portions of the second, third, and fourth layers 214b', 214c' and 214d', respectively, to form the second, third, and fourth layers 214b', 214c' and 214d' respectively of the casing liner 152 in the annular region 154. In a fifth pass the print head 202 may be rotated about the casing pipe 150 and the longitudinal axis 208 of the wellbore 120 (as illustrated by the arrow 212) as the casing liner material 210 is ejected from the nozzles 204a-204e to deposit the casing liner material 210 in particular locations to form a fifth layer 214e' of the casing liner 152 in the annular region 154. Although a certain shape of integrated structure is described for the purpose of illustration, various shapes and arrangements of integrated structures can be formed using the additive manufacturing processes described, or similar processes.

In some embodiments, the integrated structures 162 are provided to modify mechanical properties of the casing liner 152. For example, the integrated structures 162 can be strategically positioned, shaped and filled with particular types of substances to effect particular modifications to the mechanical properties of the casing liner 152, such as ductility or impact resistance. For example, the integrated structures 162 may include pockets filled with a substance, such as a polymer, having a Young's Modulus that is less than a Young's Modulus of the casing liner material 210 to effectively reduce the Young's Modulus of the resulting casing liner 152 to a level below that of the casing liner material 210. As a further example, the integrated structures 162 may be oriented to extend in a radial direction (for example, perpendicular to the casing pipe 150 or the longitudinal axis 208 of the wellbore 120) or longitudinal direction (for example, parallel to the casing pipe 150 or the longitudinal axis 208 of the wellbore 120) in the annular region 154. Such integrated structures 162 may reduce the Young's Modulus of the casing liner 152 in the radial or longitudinal direction relative to that of a casing liner 152 formed of a solid cement casing liner material 210. This can, for example, facilitate the casing liner 152 deforming radially or longitudinally to absorb variations in radial or longitudinal stresses acting on the casing liner 152, without cracking or otherwise failing.

Figure 5A:
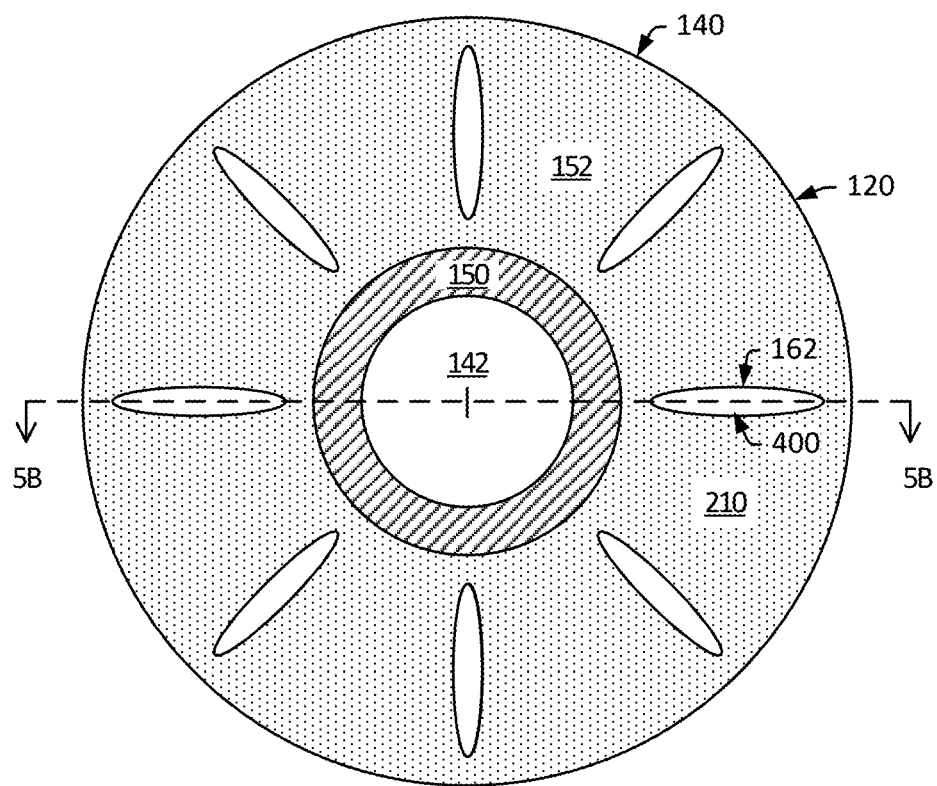
FIGS. 5A and 5B are diagrams that illustrate an example casing liner containing radially oriented integrated structures in accordance with one or more embodiments.
Figure 5B:
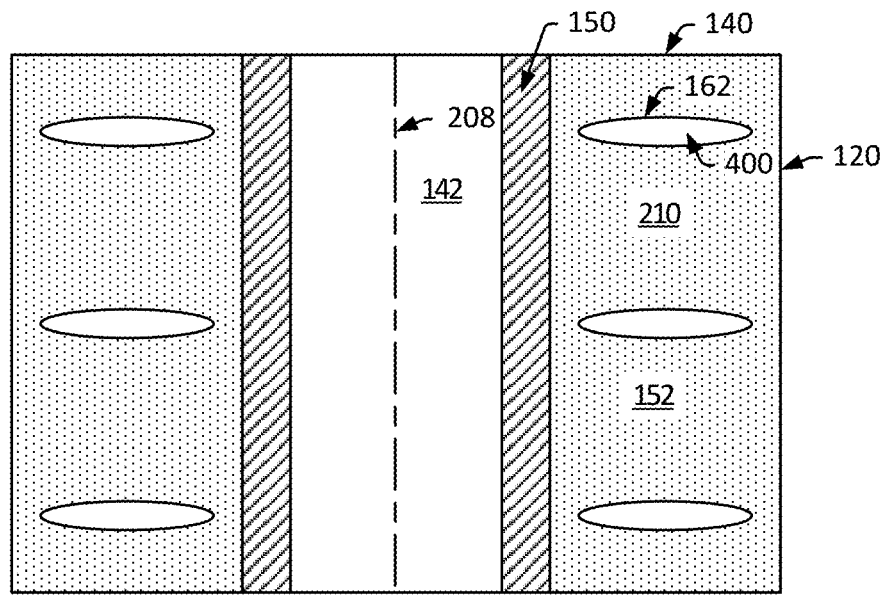

FIGS. 5A and 5B are diagrams that illustrate top and section views of an example of the casing liner 152 containing radially oriented integrated structures 162 formed within casing liner material 210 in accordance with one or more embodiments. In the illustrated embodiment, each of the oriented integrated structures 162 includes an elongated void formed in the casing liner material 210 that extends in a radial direction (for example, perpendicular to the casing pipe 150 and the longitudinal axis 208 of the wellbore 120) in the annular region 154. For example, each the oriented integrated structures 162 of FIG. 5A includes an elongated elliptical shaped void extending radially along a width of the annular region 154 in a lateral direction, generally transverse to the longitudinal axis 208 of the wellbore 120 and the casing pipe 150. Each of the oriented integrated structures 162 may be encapsulated within the casing liner material 210. The void of the integrated structures 162 may be filled with a substance, such as a polymer, having a Young's Modulus that is less than a Young's Modulus of the casing liner material 210 and thus may reduce the Young's Modulus of the casing liner 152 in the radial direction, relative to that of a solid casing liner formed of only the casing liner material 210. As described, each of the oriented integrated structures 162 may be formed by not depositing the casing liner material 210 in the region of the oriented integrated structure 162, or by depositing integrated structure material 400 into the region of the oriented integrated structure 162 in place of the casing liner material 210, for example.

Figure 6A:
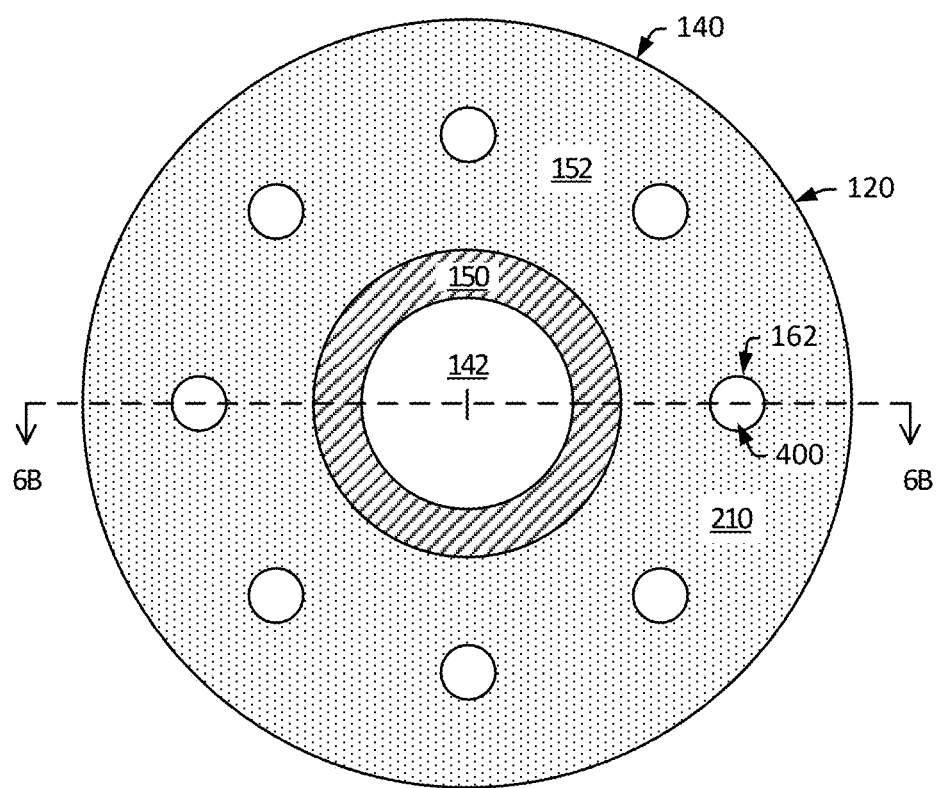
FIGS. 6A and 6B are diagrams that illustrate an example casing liner containing longitudinally oriented integrated structures in accordance with one or more embodiments.
Figure 6B:
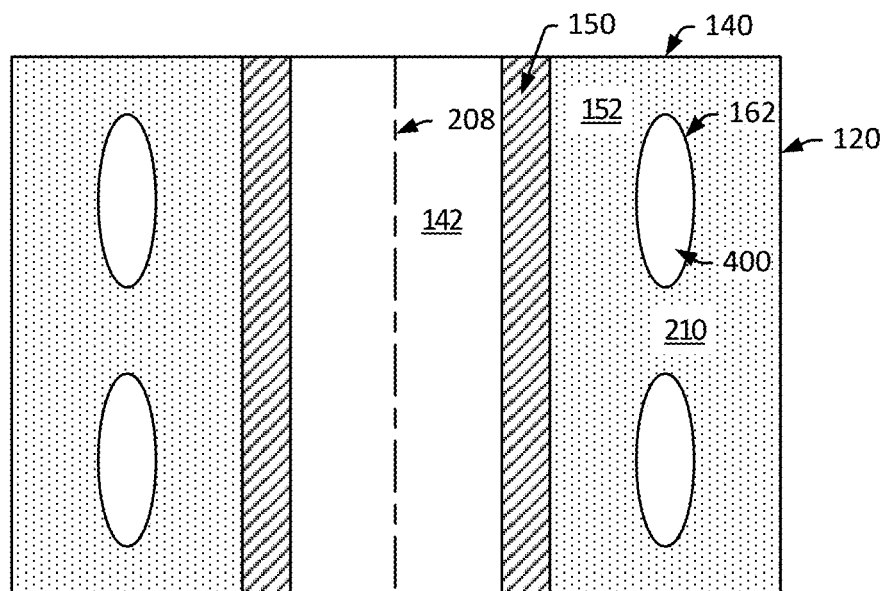

FIGS. 6A and 6B are diagrams that illustrate top and side section views of an example of the casing liner 152 containing longitudinally oriented integrated structures 162 formed within casing liner material 210 in accordance with one or more embodiments. In the illustrated embodiment, each of the longitudinally oriented integrated structures 162 includes an elongated void formed in the casing liner material 210 that extends in a longitudinally direction (for example, parallel to the casing pipe 150 and the longitudinal axis 208 of the wellbore 120) in the annular region 154. For example, each the oriented integrated structures 162 of FIG. 5B includes an elongated elliptical shaped void extending longitudinally along a length of the annular region 154 in a direction generally parallel to the longitudinal axis 208 of the wellbore 120 and the casing pipe 150. Each of the oriented integrated structures 162 may be encapsulated within the casing liner material 210. The void of the integrated structures 162 may be filled with a substance, such as a polymer, having a Young's Modulus of the casing liner material 210 and thus may reduce the Young's Modulus of the casing liner 152 in the longitudinal direction, relative to that of a solid casing liner 152 formed of only the casing liner material 210. As described, each of the oriented integrated structures 162 may be formed by not depositing the casing liner material 210 in the region of the oriented integrated structure 162, or by depositing integrated structure material 400 into the region of the oriented integrated structure 162 in place of the casing liner material 210, for example. Although elliptically shaped integrated structures 162 are described for the purpose of illustration, embodiments may include other suitably shaped integrated structures, as described here.

The integrated structure material 400 that forms the integrated structures 162 may be any of a variety of substances, including gases, liquids or solids. Examples gases include air, nitrogen and helium. Examples of liquids include water, brine (for example, calcium chloride and calcium bromide potassium chloride), organic liquids (for example, N-butyl-pyrrolidone, N-ethyl pyrrolidone, and N-methyl pyrrolidone), organic ionic liquids (for example, imidazolium salts such as butyl-imidazolium tetrafluoroborate), and silicon containing liquids (for example, siloxanes and colloidal silicas). Further examples of liquids can include monomeric liquids, which when activated, cross-polymerize to make liquids with modified rheological properties. Examples of solids include metals (for example, steel, aluminum, and nickel-aluminum alloys), polymers (for example, polyesters, polycarbonates, polyanhydrides, polyamides, polyaramids and polyurethanes), and cementitious composites (for example, Portland cement, Sorel cement, aluminate cements, and pozzolan/lime cements). Although the casing liner material 210 is often described as cement for the purpose of illustration, the casing liner material 210 may include any suitable material, such as an epoxy, phenolic resin, monomeric species such as acrylamide, which when activated, polymerize to render solid materials. In some embodiments, these materials can be either hard-set materials which are solvent-free or materials containing solvent which cure as gels. Further examples include layered composites. These can include combinations of solids, gases or liquids, such as those described above, arranged into layers. Such layered composites may provide advantageous mechanical or chemical properties for conditions within the well-bore.

In some embodiments, an integrated structure 162 is formed in the wellbore independent of the depositing of the casing liner material 210. For example, an integrated structure 162 formed of the integrated structure material 400, such as a honeycomb shaped structure formed of a polymer, may be printed in the annular region 154 of the wellbore 120 to from an integrated structure 162 having one or more contiguous voids formed in the structure material. The casing liner material 210, such as cement, may then be injected into the one or more contiguous voids of the integrated structure 162 to form the casing liner 152 including a matrix of the casing liner material 210 and the material of the integrated structure 162. In some embodiments, the casing liner material 210 is deposited in the wellbore independent of the deposition of the integrated structure material 400. For example, the casing liner material 210, such as cement, may be printed in the annular region 154 of the wellbore 120 with one or more contiguous integrated void structures formed in the casing liner material, such as a contiguous honeycomb shaped void structure. An integrated structure material 400, such as a polymer, may then be injected into the one or more contiguous integrated void structures of the printed casing liner material 210 to form the casing liner 152 including a matrix of the casing liner material 210 and the material of the integrated structure 162.

Figure 7A:
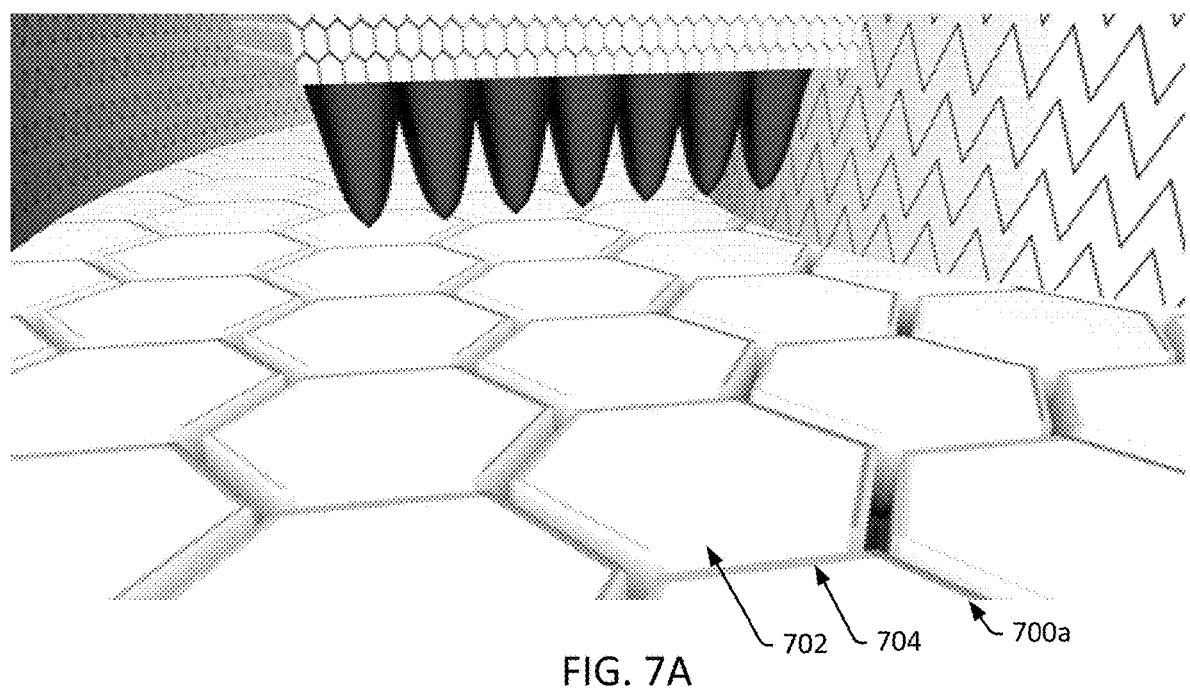
FIG. 7A-7N are diagrams that illustrate an example structures in accordance with one or more embodiments.
Figure 7B:
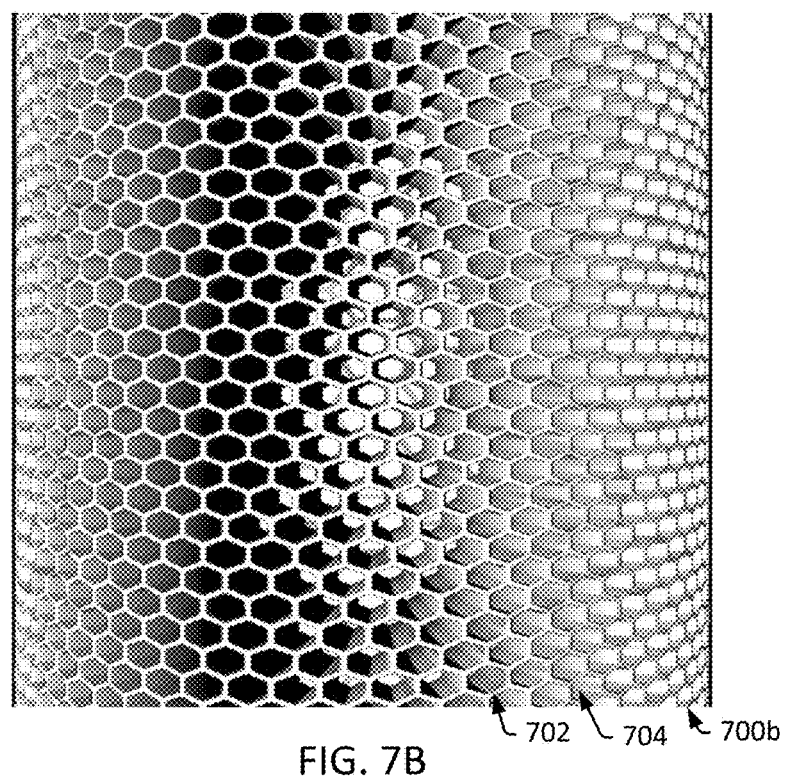
Figure 7E:
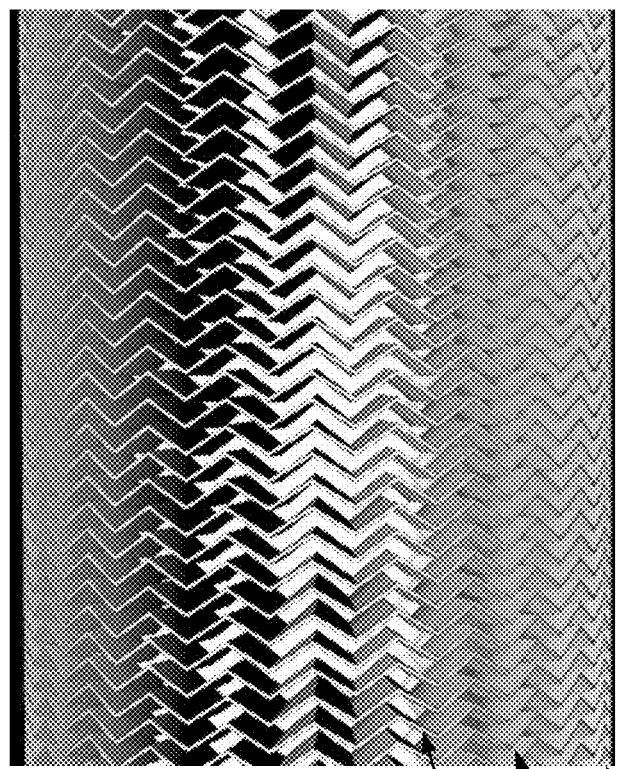
Figure 7F:
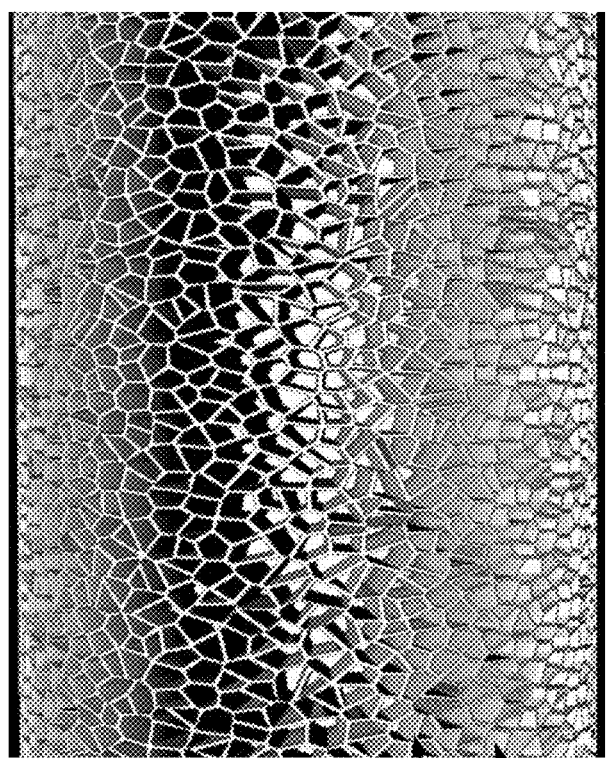
Figure 7G:
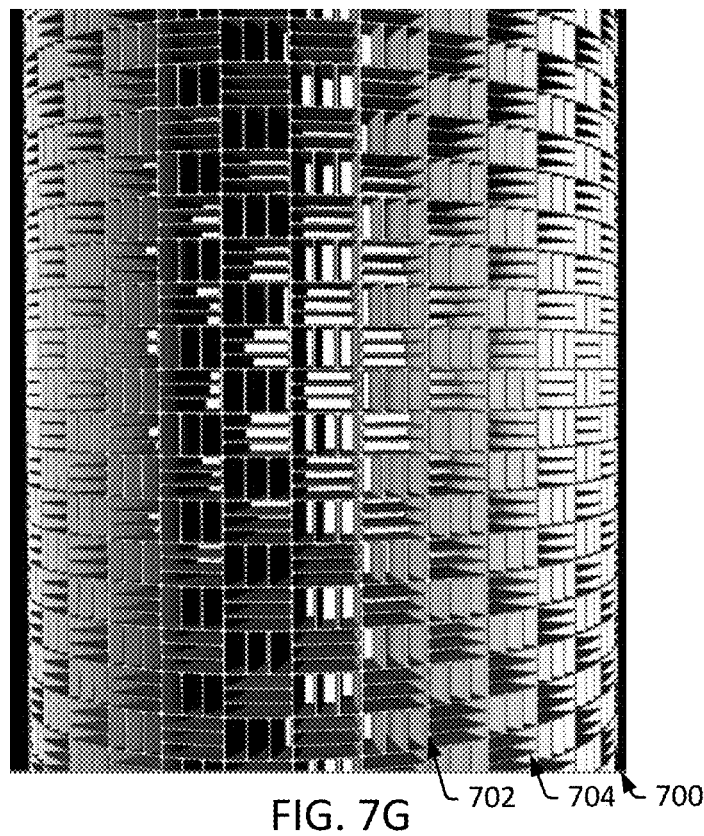
Figure 7H:
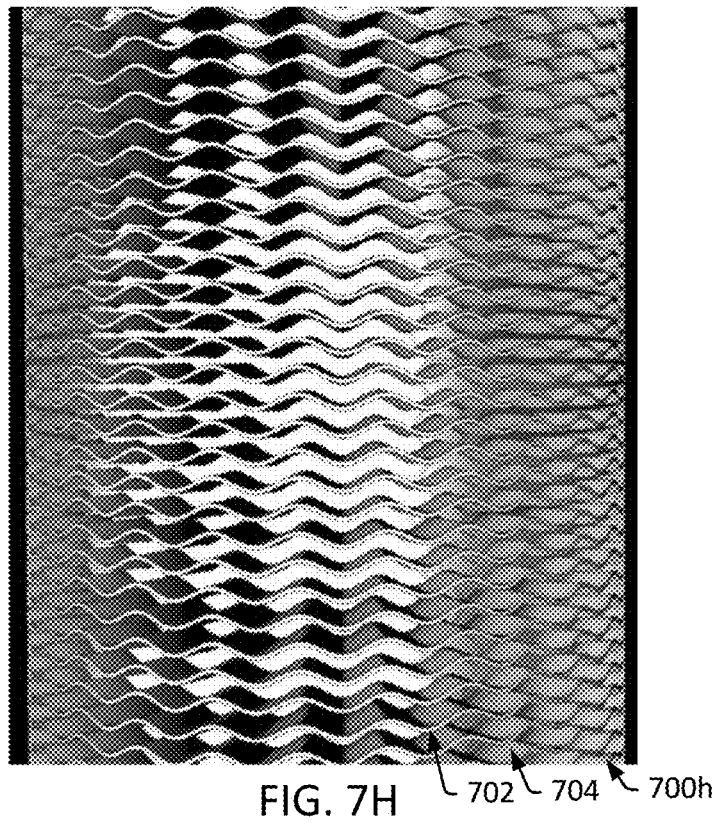
Figure 7I:
Figure 7J:
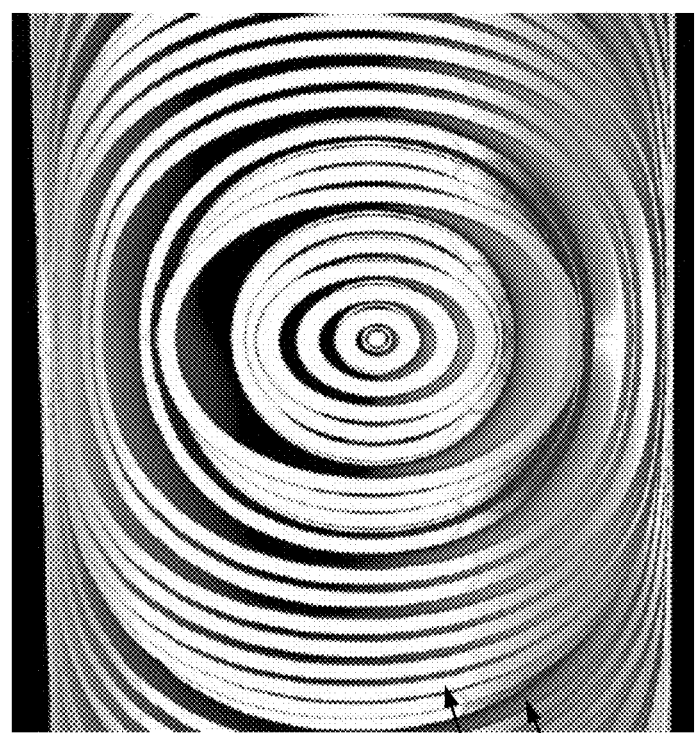
Figure 7K:
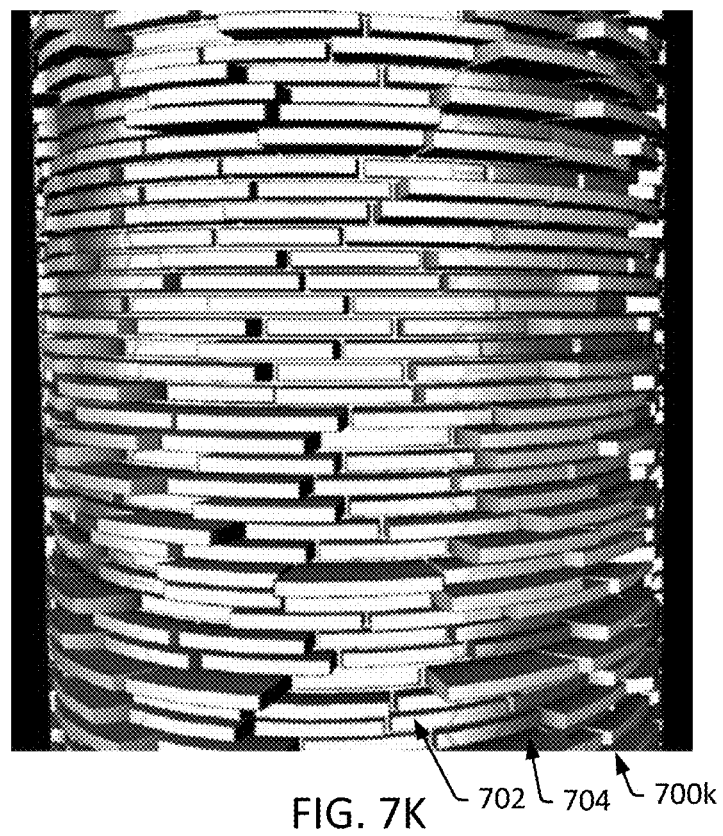
Figure 7L:
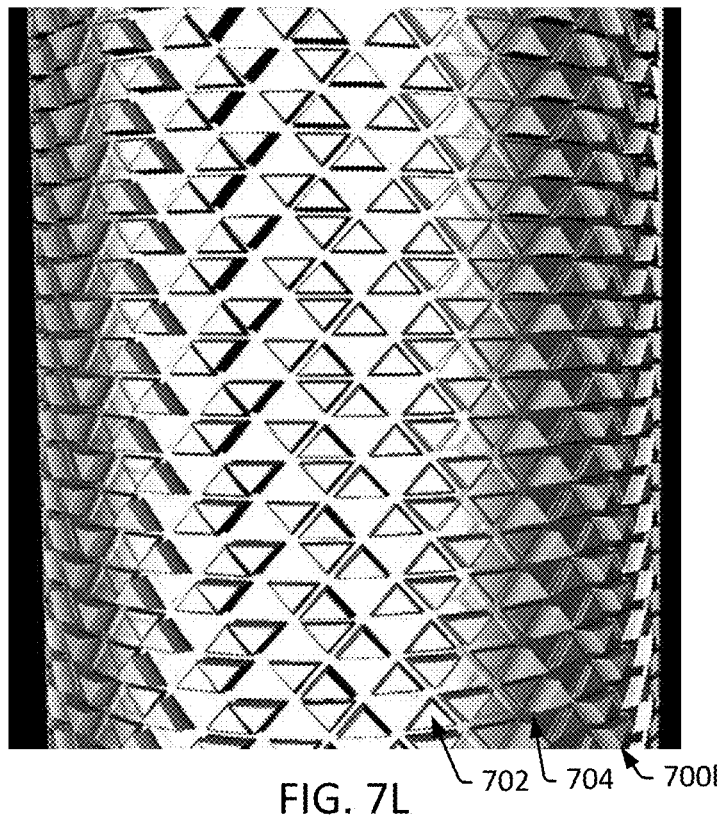
Figure 7M:
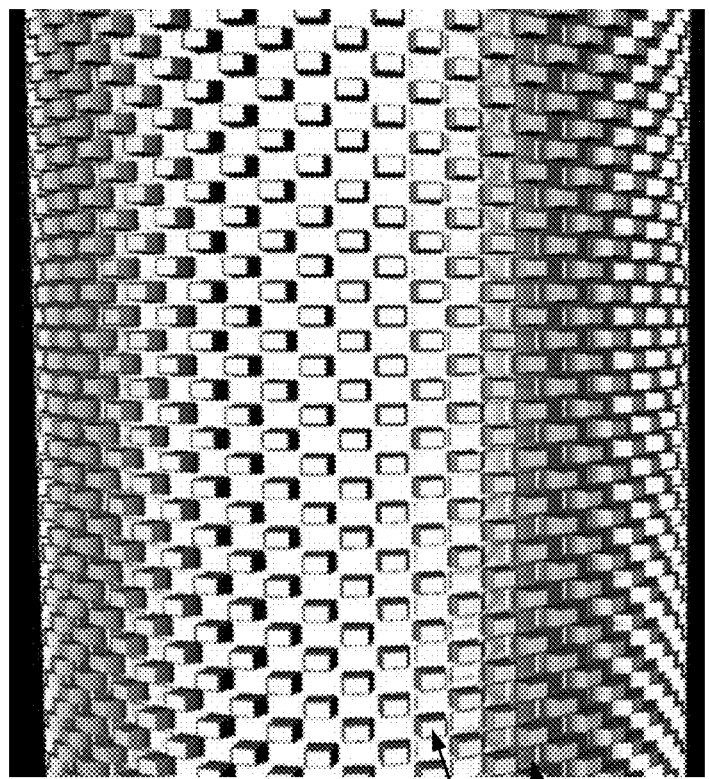
Figure 7N:
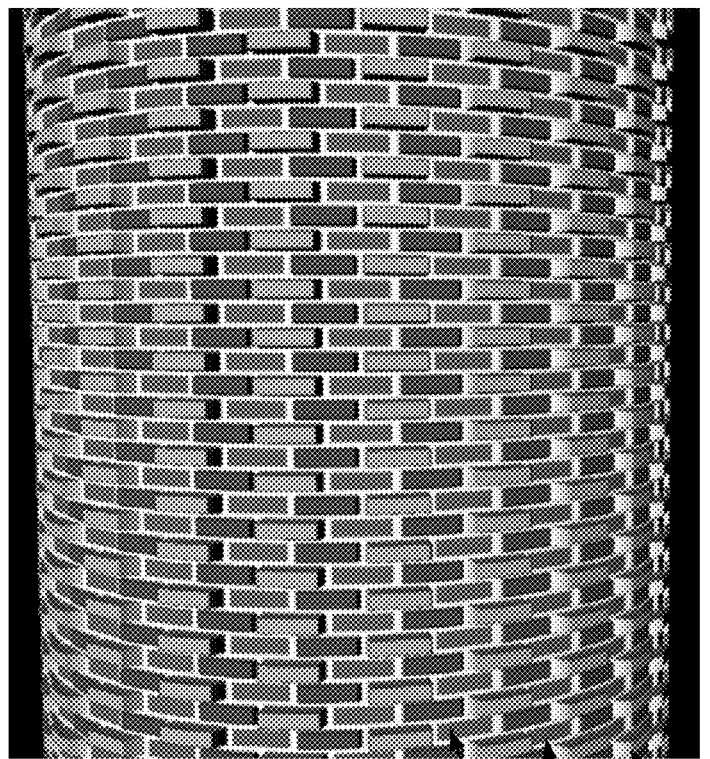

FIGS. 7A-7N illustrate example integrated structures 162 (including integrated structures 700a-700n) in accordance with one or more embodiments. The arrangement of the integrated structures 162 may be adapted to provide characteristics that are suitable in the wellbore environment in which they are disposed. For example, the integrated structures can include various patterns and can be formed of certain materials or combinations of different materials. In some embodiments, the integrated structures 700a-700n include structural elements 702 and corresponding void regions 704. The void regions 704 may include one or more contiguous channels or regions within the structural elements 702 of the respective structure. FIG. 7A illustrates a honeycomb shaped integrated structure 700a deposited in a wellbore and having longitudinally oriented hexagonal structural elements 702 and corresponding longitudinally oriented hexagonal void regions 704. FIG. 7B illustrates a honeycomb shaped integrated structure 700b having radially oriented hexagonal structural elements 702 and corresponding radially oriented hexagonal void regions 704. FIG. 7C illustrates a mesh shaped integrated structure 700c having radially oriented structural elements 702 and corresponding radially oriented cylindrical void regions 704. FIG. 7D illustrates a mesh shaped integrated structure 700d having radially oriented rectangular structural elements 702 and corresponding radially oriented rectangular void regions 704. FIG. 7E illustrates a mesh shaped integrated structure 700e having radially oriented angular structural elements 702 and corresponding radially oriented angular void regions 704. FIG. 7F illustrates a mesh shaped integrated structure 700f having radially oriented polygonal structural elements 702 and corresponding radially oriented polygonal void regions 704. FIG. 7G illustrates a mesh shaped integrated structure 700g having longitudinal and radially oriented patterned rectangular structural elements 702 and corresponding longitudinal and radially oriented patterned rectangular void regions 704. FIG. 7H illustrates a mesh shaped integrated structure 700h having radially oriented wave structural elements 702 and corresponding radially oriented wave void regions 704. FIG. 7I illustrates a mesh shaped integrated structure 700i having radially oriented spiral structural elements 702 and corresponding radially oriented spiral void regions 704. FIG. 7J illustrates a mesh shaped integrated structure 700j having radially oriented circular structural elements 702 of varying radial lengths and corresponding radially oriented circular void regions 704. FIG. 7K illustrates a mesh shaped integrated structure 700k having radially oriented rectangular block structural elements 702 of varying radially lengths and corresponding radially oriented void regions 704. FIG. 7L illustrates a mesh shaped integrated structure 700l having radially oriented prismic block structural elements 702 of varying radially lengths and corresponding radially oriented void regions 704. FIG. 7M illustrates a mesh shaped integrated structure 700m having a pattern of radially oriented rectangular block structural elements 702 and corresponding radially oriented void regions 704. FIG. 7N illustrates a mesh shaped integrated structure 700n having a pattern of radially oriented rectangular block structural elements 702 (for example, different subsets of the block structural elements 702 being formed of different materials, as indicated by the varied shading of subsets of the blocks) and corresponding radially oriented void regions 704. Although certain arrangements of integrated structures 162 are described for the purpose of illustration, the arrangements can have any suitable shape, and be formed of any suitable material. For example, the arrangements of integrated structures 162 can include spiral structures, brick layered structures, circular structures, prismic structures, or other geometric shapes, and can include brick patterns, mosaic patterns, parquet patterns, patterns with triangles, circles, squares, or other geometric patterns. The arrangements of integrated structures 162 can be formed of one of or a combination of liquids, solids, and gases.

As described, in some embodiments, the integrated structures 700a-700n may be formed by way of an additive manufacturing technique, such as three-dimensional 3D printing. For example, an integrated structure 162 formed of the integrated structure material 400, such as a honeycomb shaped integrated structure 700a or 700b formed of a polymer, is printed in the annular region 154 of the wellbore 120 using an additive manufacturing technique. A casing liner material 210, such as cement, may be injected into the annular region 154 and the void regions 704 to form the casing liner 152 including a matrix of the casing liner material 210 and the integrated structure material 400 of the integrated structure 162. In some embodiments, the casing liner material 210 is placed to define a structure having voids, and the integrated structure material 400 is deposited in the resulting void regions. For example, a casing liner material 210, such as cement, having a structure consistent with the structural elements 702 of the integrated structure 162, such as the honeycomb shaped integrated structure 700a or 700b, may be printed in the annular region 154 of the wellbore 120 using an additive manufacturing technique, such as 3D printing, to form printed casing liner material 210 having one or more voids formed in the casing liner material that corresponds to the void regions 704 of the integrated structure 162, such as the honeycomb shaped voids 704 of integrated structure 700a or 700b. An integrated structure material 400, such as a polymer, may be injected into the void regions 704 formed in the printed casing liner material 210 to form the casing liner 152 including a matrix of the casing liner material 210 and the integrated structure material 400 of the integrated structure 162. Although a honeycomb shape is discussed for the purpose of illustration, embodiments can employ any suitable structural arrangement, such as those of any of the integrated structures 700a-700n.

Figure 8:
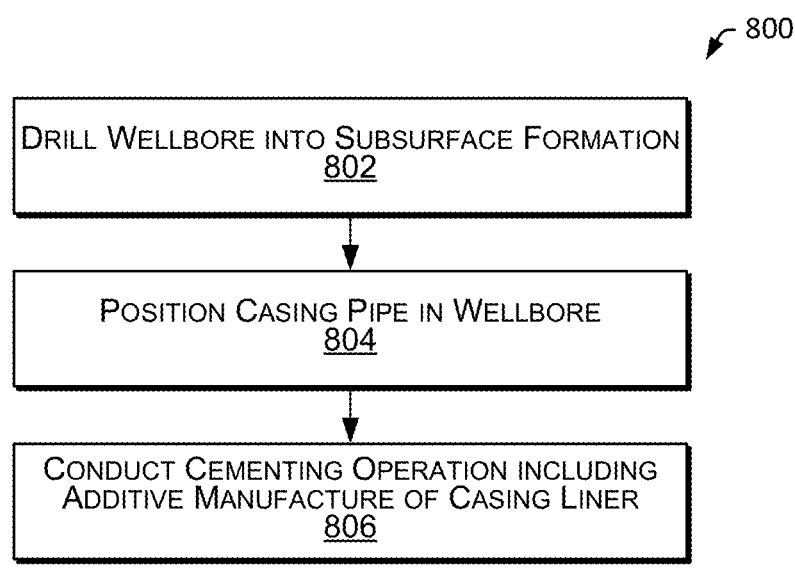
FIG. 8 is a flowchart that illustrates a method of printing a casing liner in accordance with one or more embodiments.

FIG. 8 is a flowchart that illustrates a method 800 of printing a casing liner in accordance with one or more embodiments. The method 800 may generally include drilling a wellbore into a subsurface formation (block 802), positioning casing pipe in the wellbore (block 804), and conducting a cementing operation including additive manufacture of a casing liner (block 806). In some embodiments, drilling a wellbore into a subsurface formation (block 802) includes drilling the wellbore 120 into the formation 104 and the reservoir 102 as described here. For example, the well control system 122 may control a drilling rig to drill the wellbore 120 into the formation 104 and the reservoir 102 along a given wellbore trajectory. In some embodiments, positioning casing pipe in the wellbore (block 804) includes positioning the casing pipe 150 into the wellbore 120. For example, the well control system 122 may control a drilling rig to lower the casing pipe 150 into a given depth interval of the wellbore 120. In some embodiments, conducting a cementing operation including additive manufacture of a casing liner (block 806) includes forming the casing liner 152 in the annular region 154 by way of an additive manufacturing process, such as 3D printing of the casing liner material 210, or the casing liner material 210 and the integrated structure material 400, as described here, to form the casing liner 152 without or with integrated structures 162. For example, the well control system 122 may control the casing liner printing system 200 to deposit the casing liner material 210, or the casing liner material 210 and the integrated structure material 400, as described here, to form the casing liner 152 without integrated structures 162 (for example, as described with regard to at least FIGS. 2A and 2B) or with integrated structures 162 (for example, as described with regard to at least FIGS. 3-7).

Figure 9A:
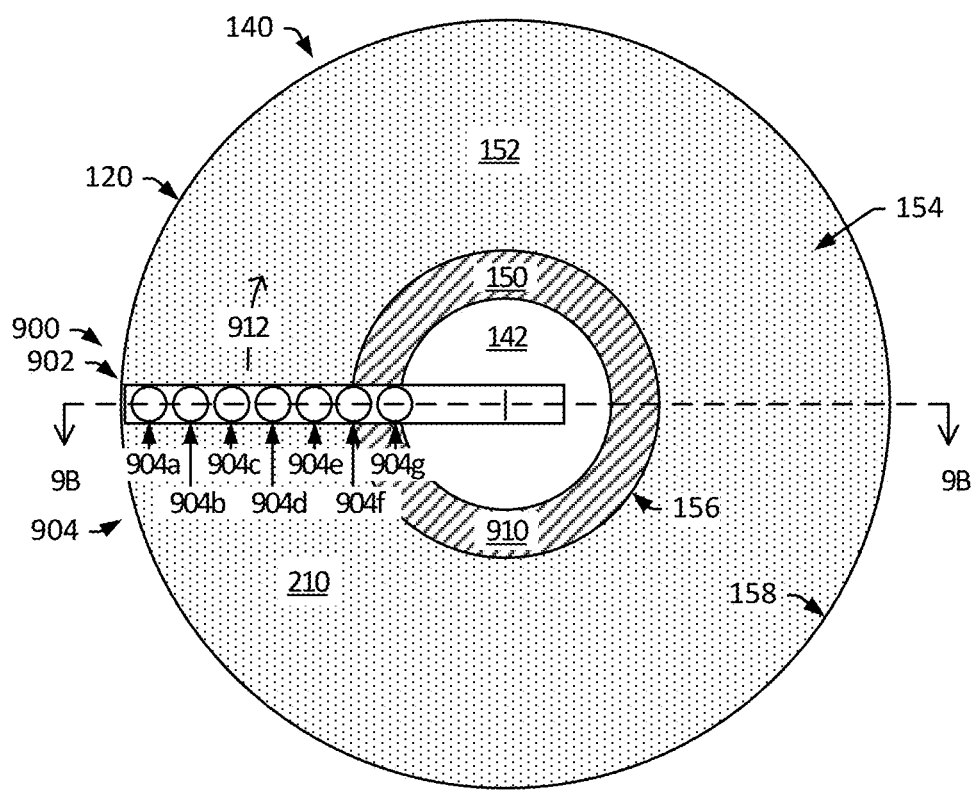
FIGS. 9A and 9B are diagrams that illustrate an example casing formed by way of an additive manufacturing process in accordance with one or more embodiments.
Figure 9B:
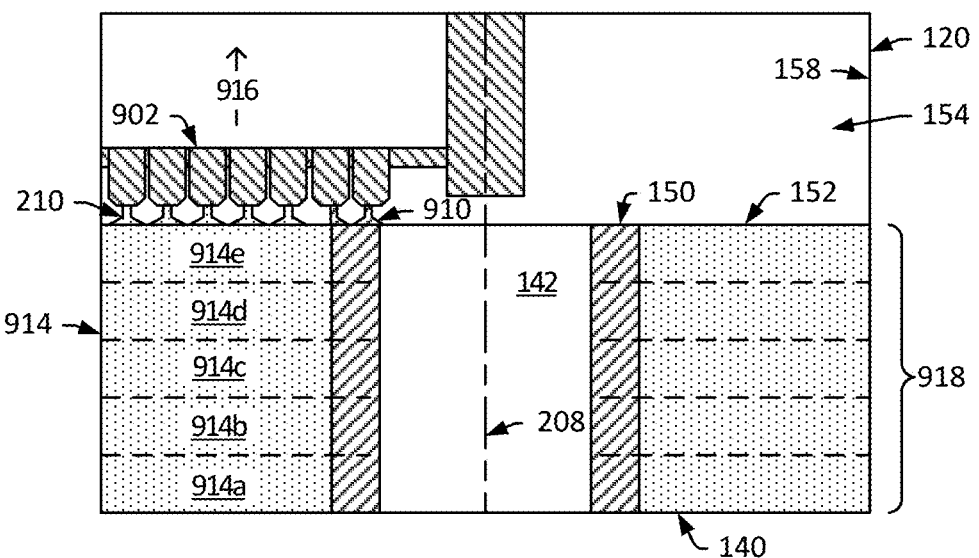

In some embodiments, additive manufacturing can be employed to manufacture a tubular, such as casing pipe or production tubing in place. For example, the casing liner printing system 200 may be operated to print both the casing liner 152 and the casing pipe 150 downhole, as a print head of the casing liner printing system 200 is advanced through the wellbore 120. This can, for example, enable a single casing printing operation to replace the running of the casing pipe 150, such as steel pipe, into the wellbore 120 and the separate installation of the casing liner, such as cement, into the annular region 154. FIGS. 9A and 9B are diagrams that illustrate top and side section views of an example casing 140 formed by way of an additive manufacturing process in accordance with one or more embodiments. In the illustrated embodiment, a casing printing system 900 includes a casing print head 902 positioned in the wellbore 120. The casing print head 902 may include multiple nozzles 904 (for example, nozzles 904a-904g). During a casing printing operation, the casing printing system 900 may be operated to eject casing liner material 210 from a first subset of the nozzles 904 (for example, from nozzles 904a-904e) and to eject casing pipe material 910 from a second subset of the nozzles 904 (for example, nozzles 904f and 904g) to form the casing pipe 150. For example, during a casing printing operation, the print head 902 may be rotated about the longitudinal axis 208 of the wellbore 120 (as illustrated by the arrow 912) as casing liner material 210, such as cement, is ejected from a first subset of the nozzles 904 (for example, nozzles 904a-904e) and casing pipe material 910, such as steel, is ejected from a second subset of the nozzles 204 (for example, nozzles 904f and 904g) to simultaneously deposit the casing liner material 210 and the casing pipe material 910 in particular locations to form at least a first layer 914a of the casing 140 in the wellbore 120.

In some embodiments, multiple rotational passes of the print head 902 are made in coordination with the print head 902 being advanced along the length of the wellbore 120 to deposit multiple layers of casing liner material 210 and casing pipe material 910 to form the casing liner 152 and the casing pipe 150 in the wellbore 120. Continuing with the prior example, during a casing printing operation, after the first layer 914a is formed by way of a first rotational pass of the print head 902 about the wellbore 120, the print head 902 may be advanced longitudinally along the length of the wellbore 120 (for example, parallel to the longitudinal axis 208 of the wellbore 120) (as illustrated by the arrow 916) by a distance equal to a thickness of a second layer 914b of the casing 140 to be formed, and again be rotated about the longitudinal axis 208 of the wellbore 120 (as illustrated by the arrow 912) as casing liner material 210, such as cement, is ejected from a first subset of the nozzles 204 (for example, nozzles 904a-904e) and casing pipe material 910, such as steel, is ejected from a second subset of the nozzles 204 (for example, nozzles 904f and 904g) to simultaneously deposit the casing liner material 210 and the casing pipe material 910 in particular locations to form at least a second layer 914b of the casing 140 in the wellbore 120. A similar iterative layering approach can be conducted to form additional layers 914 of the casing liner 152. For example, additional layers 914c-914e of the casing 140 may be formed to form the casing 140 across a depth interval 918. The resulting casing 140 may be referred to as "printed" casing. Although only five layers (914a-914e) of the casing 140 are discussed for the purpose of illustration, embodiments can include any suitable number of layers to form the printed casing 140 across a given depth interval. Although embodiments describe advancing the print head 902 vertically in an incrementally manner, after completing a rotational pass about the wellbore 120, embodiments can any suitable path of advancement of the print head 902 to form the casing 140. For example, the print head 902 may be advanced vertically as it is rotated about the wellbore 120 to, for example, form a contiguous helical layer that forms the printed casing 140 across a depth interval. Although a casing operation is described for the purpose of illustration, embodiments can include forming other types of tubular members in a similar manner. For example, a production tubing may be formed downhole alone, or in conjunction with forming of casing (for example, a production tubing with a casing pipe and a casing liner surrounding the production tubing). In such an embodiment, nozzles may be provided at radial locations corresponding to the walls of the production tubing, and may eject production tubing material, such as steel, to form the production tubing in a manner similar to that described with regard to the casing 140.

Figure 10:
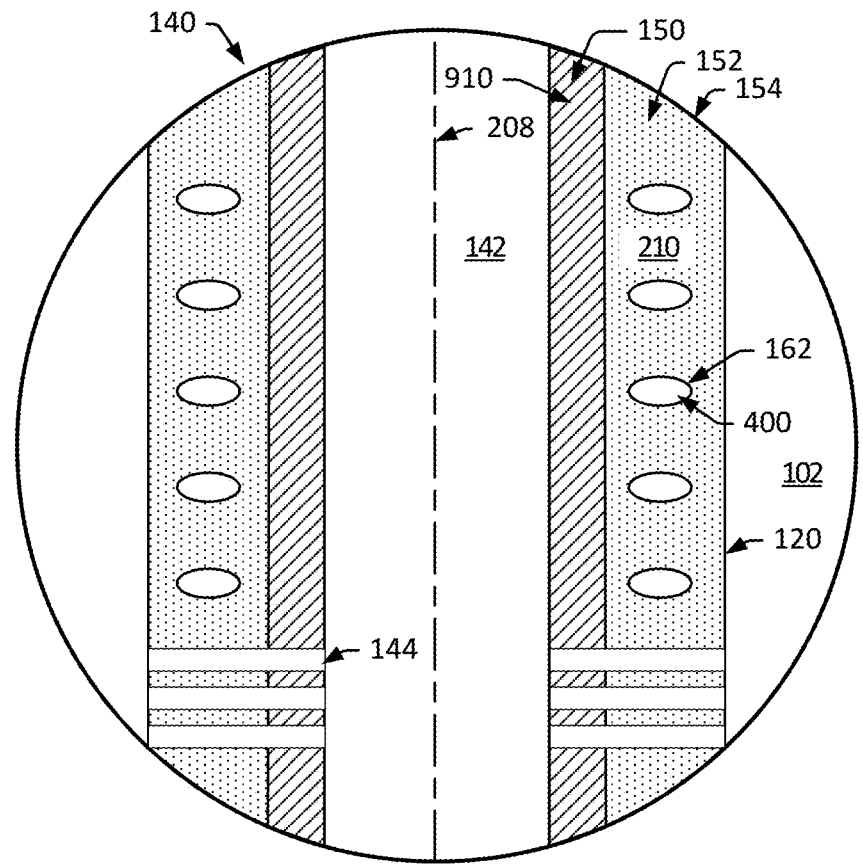
FIG. 10 is a diagram that illustrates printing casing having integrated structures, including perforations in accordance with one or more embodiments.

In some embodiments, a casing printing operation can include printing integrated structures into the casing 140. For example, a casing printing operation can include printing integrated structures similar to those discussed with regard to at least FIGS. 3-7 into the casing liner 152 of the printed casing 140. In some embodiments, the integrated structures can include perforations. Perforations may include contiguous voids that extend radially through the casing 140 (for example, from an interior wall of the printed casing pipe 150 to an exterior surface of the printed casing liner 152) to define openings that extend between an exterior of the casing 140 and the central passage 142 of the casing 140. A perforation may facilitate the flow of production substances, such as oil and gas, from the reservoir 102 into the central passage 142 or to facilitate the flow of injection substances, such as water, from the central passage 142 into the formation 104. FIG. 10 is a diagram that illustrates printed casing 140 having integrated structures 162, including perforations 144, in accordance with one or more embodiments. In some embodiments, the perforations 144 may be formed of a solid substance that initially inhibits flow through the perforation, but that can be dissolved or otherwise removed to enable the flow of fluids there through. For example, a perforation 144 may be formed by printing a polymer into a void region that defines the perforation 144, and the polymer may later be exposed to a chemical that dissolves the polymer, or an elevated temperature that melts the polymer, leaving a passage defined by the void. Although individual elongated perforations are described for the purpose of illustration, embodiments can include any suitable form of perforation. For example, a perforation 144 may be defined by an integrated mesh (or "screen") printed into the casing pipe 150 and an adjacent opening(s) formed in the casing liner 152. The mesh may inhibit debris from traveling between the surrounding portion of the formation and the central passage 142 of the casing 150.

Figure 11:
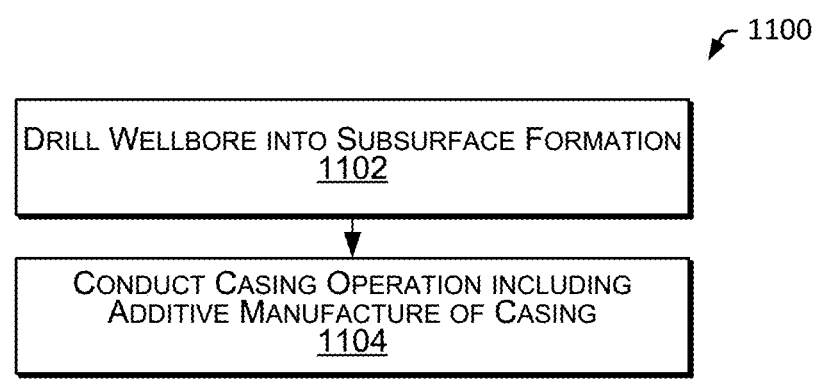
FIG. 11 is a flowchart that illustrates a method of printing a casing in accordance with one or more embodiments.

FIG. 11 is a flowchart that illustrates a method 1100 of printing a casing in accordance with one or more embodiments. The method 1100 may generally include drilling a wellbore into a subsurface formation (block 1102) and conducting a casing operation including additive manufacture of a casing (block 1104). In some embodiments, drilling a wellbore into a subsurface formation (block 1102) includes drilling the wellbore 120 into the formation 104 and the reservoir 102 as described here. For example, the well control system 122 may control a drilling rig to drill the wellbore 120 into the formation 104 and the reservoir 102 along a given wellbore trajectory. In some embodiments, conducting a casing operation including additive manufacture of a casing (block 1104) includes forming the casing 140 in the wellbore 120 by way of an additive manufacturing process, such as 3D printing of the casing pipe material 910, the casing pipe material 910 and the casing liner material 210, or the casing pipe material 910, the casing liner material 210 and the integrated structure material 400, as described here, to form the casing 140, including the casing pipe 150 and the casing liner 152 without or with integrated structures 162. For example, the well control system 122 may control the print head 902 to deposit the casing pipe material 910, the casing pipe material 910 and the casing liner material 210, or the casing pipe material 910, the casing liner material 210 and the integrated structure material 400, as described here, to form the casing 140, including the casing pipe 150 and the casing liner 152 without or with integrated structures 162. Although a casing operation is described for the purpose of illustration, embodiments can include forming other types of tubular members in a similar manner. For example, a production tubing may be formed downhole alone, or in conjunction with forming of casing (for example, a production tubing with a casing pipe and a casing liner surrounding the production tubing). In such an embodiment, nozzles may be provided at radial locations corresponding to the walls of the production tubing, and may eject production tubing material, such as steel, to form the production tubing in a manner similar to that described with regard to the casing 140.

Although certain embodiments describe additive manufacturing including layering in a bottom-up approach (for example, forming a subsequent layer on top of (or on an up-hole side of) a previous layer) to form a printed casing liner 152 or printed casing 140, embodiments can employ any suitable technique to form a printed casing liner 152 or a printed casing 140. For example, embodiments can include layering in a top-down approach (for example, forming a subsequent layer underneath (or on a down-hole side of) a previous layer) to form a printed casing liner 152 or a printed casing 140.

Figure 12:
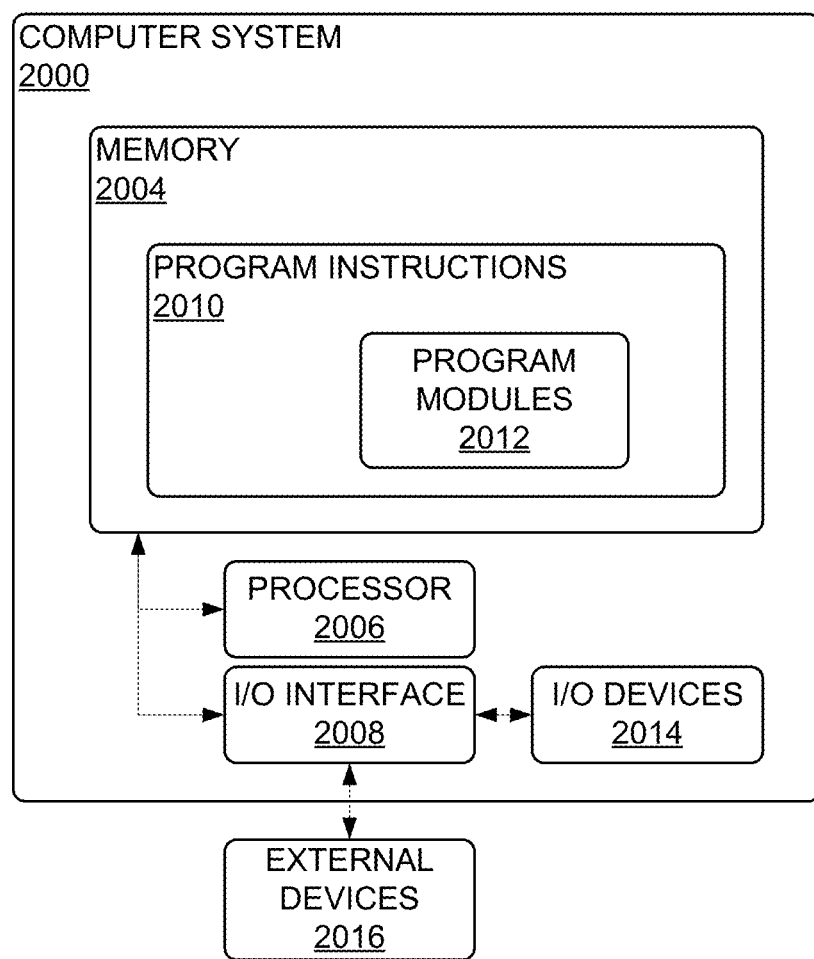
FIG. 12 is a diagram that illustrates an example computer system in accordance with one or more embodiments.

FIG. 12 is a diagram that illustrates an example computer system (or "system") 2000 in accordance with one or more embodiments. In some embodiments, the system 2000 is a programmable logic controller (PLC). The system 2000 may include a memory 2004, a processor 2006 and an input/output (I/O) interface 2008. The memory 2004 may include one or more of non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), and bulk storage memory (for example, CD-ROM or DVD-ROM, hard drives). The memory 2004 may include a non-transitory computer-readable storage medium having program instructions 2010 stored thereon. The program instructions 2010 may include program modules 2012 that are executable by a computer processor (for example, the processor 2006) to cause the functional operations described, such as those described with regard to the well control system 122, the method 800 or the method 1100.

The processor 2006 may be any suitable processor capable of executing program instructions. The processor 2006 may include a central processing unit (CPU) that carries out program instructions (for example, the program instructions of the program module(s) 2012) to perform the arithmetical, logical, and input/output operations described. The processor 2006 may include one or more processors. The I/O interface 2008 may provide an interface for communication with one or more I/O devices 2014, such as a joystick, a computer mouse, a keyboard, and a display screen (for example, an electronic display for displaying a graphical user interface (GUI)). The I/O devices 2014 may include one or more of the user input devices. The I/O devices 2014 may be connected to the I/O interface 2008 via a wired connection (for example, Industrial Ethernet connection) or a wireless connection (for example, Wi-Fi connection). The I/O interface 2008 may provide an interface for communication with one or more external devices 2016, such as sensors, valves, motors, other computers and networks. In some embodiments, the I/O interface 2008 includes one or both of an antenna and a transceiver. In some embodiments, the external devices 2016 include the casing liner printing system 200 or the casing printing system 900.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (that is, meaning having the potential to), rather than the mandatory sense (that is, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of casing a wellbore of a hydrocarbon well, the method comprising:
    disposing a casing print head in a wellbore of a hydrocarbon well; and
    conducting a downhole casing operation comprising:
        operating the casing print head to eject casing material to form a casing tubular in the wellbore;
        operating the casing print head to eject cementitious casing liner material into an annular region located between the casing tubular and a wall of the wellbore to form a casing liner in the annular region formed of the cementitious casing liner material, the casing tubular and the casing liner forming a casing of the wellbore;
        forming a perforation in the casing, forming the perforation in the casing comprising operating the casing print head to form a contiguous void extending radially across the casing tubular and the casing liner, wherein operating the casing print head to form a contiguous void extending radially across the casing tubular and the casing liner comprises operating the casing print head to deposit a disposable material to define the contiguous void extending radially across the casing tubular and the casing liner; and
        performing a perforation operation comprising removing the disposable material.

2. The method of claim 1, wherein the downhole casing operation comprises advancing the casing print head along a length of the wellbore and ejecting the casing material and the casing liner material along the length of the wellbore to form the casing along the length of the wellbore.

3. The method of claim 1, wherein the disposable material comprises a dissolvable material, and wherein the perforation operation comprises exposing the dissolvable material to a substance configured to dissolve the dissolvable material.

4. The method of claim 1, wherein the casing liner material comprises casing cement.

5. A method of lining a wellbore of a hydrocarbon well, the method comprising:
    disposing a liner print head in a wellbore of a hydrocarbon well; and
    conducting a downhole lining operation comprising:
        operating the lining print head to eject tubular material to form a tubular in the wellbore;
        operating the lining print head to eject a cementitious liner material into an annular region located between the tubular and a wall of the wellbore to form, in the annular region, a casing liner in the wellbore formed of the cementitious liner material, the tubular and the casing liner forming a lined tubular in the wellbore,
        forming a perforation in the lined tubular, forming the perforation in the lined tubular comprising operating the casing print head to form a contiguous void extending radially across the tubular and the casing liner, wherein operating the casing print head to form a contiguous void extending radially across the tubular and the casing liner comprises operating the lining print head to deposit a disposable material to define the contiguous void extending radially across the tubular and the casing liner; and
        performing a perforation operation comprising removing the disposable material.

6. The method of claim 5, wherein the downhole lining operation comprises advancing the lining print head along a length of the wellbore and ejecting the tubular material and the lining material along the length of the wellbore to form the casing along the length of the wellbore.

* * * * *